United States Patent
Lee et al.

(10) Patent No.: US 9,609,090 B2
(45) Date of Patent: Mar. 28, 2017

(54) SIGNALING METHOD

(71) Applicant: NEWRACOM, INC., Irvine, CA (US)

(72) Inventors: Ilgu Lee, Daejeon (KR); Jeongchul Shin, Daejeon (KR); Jongee Oh, Irvine, CA (US); Changwahn Yu, Daejeon (KR); Hyungu Park, Daejeon (KR)

(73) Assignee: NEWRACOM, INC., Irvine, CA (US)

( * ) Notice: Subject to any disclaimer, the term of this patent is extended or adjusted under 35 U.S.C. 154(b) by 104 days.

(21) Appl. No.: 14/695,907

(22) Filed: Apr. 24, 2015

(65) Prior Publication Data

US 2015/0312386 A1    Oct. 29, 2015

Related U.S. Application Data

(60) Provisional application No. 61/985,409, filed on Apr. 28, 2014, provisional application No. 62/088,450, filed on Dec. 5, 2014.

(30) Foreign Application Priority Data

Apr. 7, 2015 (KR) .......................... 10-2015-0049155

(51) Int. Cl.
*H04W 28/06* (2009.01)
*H04L 29/06* (2006.01)
*H04W 84/12* (2009.01)

(52) U.S. Cl.
CPC .............. *H04L 69/22* (2013.01); *H04L 69/04* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 5,787,077 A | * | 7/1998 | Kuehnel | H04Q 11/0478 370/331 |
| 2004/0105414 A1 | * | 6/2004 | Narayanan | H04W 88/04 370/338 |
| 2007/0047682 A1 | * | 3/2007 | Haentzschel | H04L 5/06 375/350 |

* cited by examiner

*Primary Examiner* — Chi H Pham
*Assistant Examiner* — Shick Hom

(57) ABSTRACT

A signaling method is provided by a device in a WLAN. The device includes signaling information in an address field, generates a MAC frame including the address field, and transmits a PHY frame including a data field into which the MAC frame is inserted.

18 Claims, 32 Drawing Sheets

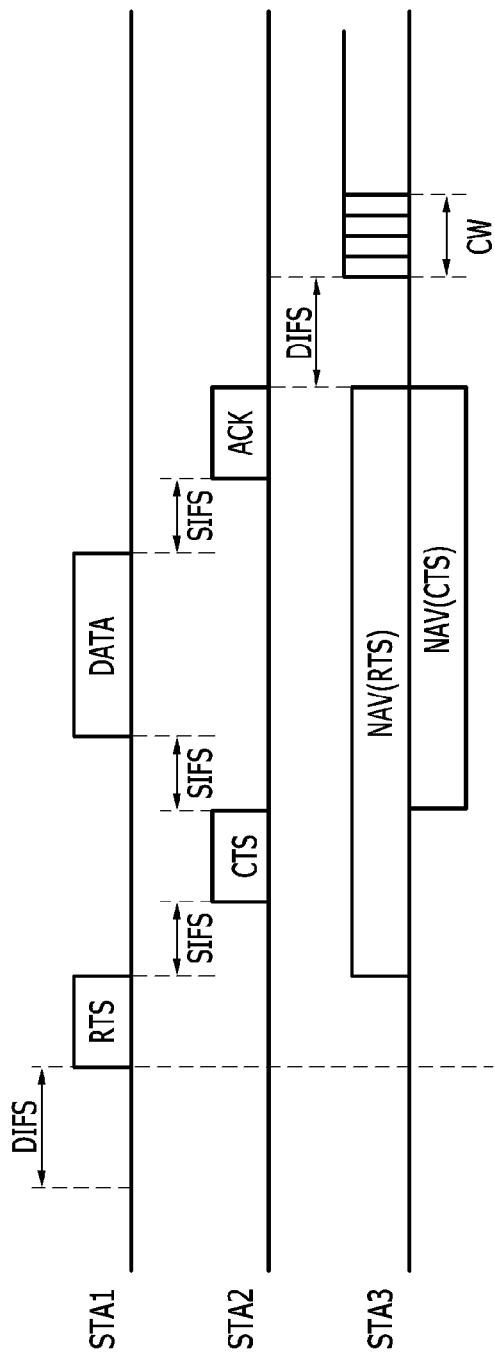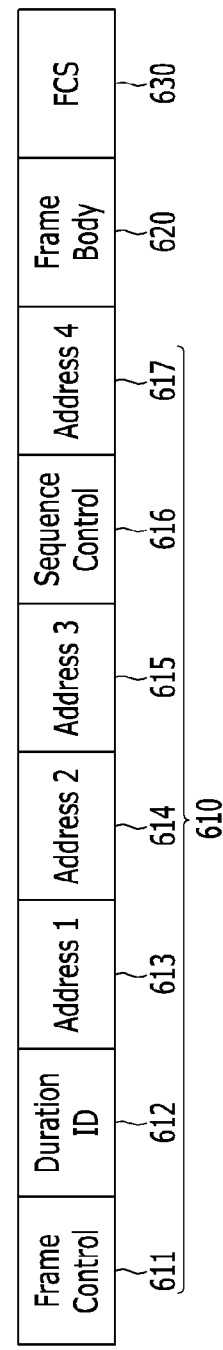

SIGNALING METHOD

CROSS-REFERENCE TO RELATED APPLICATION

This application claims priority to and the benefit of U.S. Provisional Application Nos. 61/985,409 and 62/088,450, filed on Apr. 28, 2014 and Dec. 5, 2014 in the U.S. Patent and Trademark Office and priority to and the benefit of Korean Patent Application No. 10-2015-0049155, filed on Apr. 7, 2015 in the Korean Intellectual Property Office, the entire contents of which are incorporated herein by reference.

BACKGROUND (a) Field

The described technology relates generally to a signaling method. More particularly, the described technology relates generally to a signaling method in a wireless local area network (WLAN).

(b) Description of the Related Art

A WLAN is being standardized by the IEEE (Institute of Electrical and Electronics Engineers) Part 11 under the name of "Wireless LAN Medium Access Control (MAC) and Physical Layer (PHY) Specifications."
After an original standard was published on 1999, new version standards are continuously published by amendments. The IEEE standard 802.11a (IEEE Std 802.11a-1999) supporting 2.4 GHz band was published on 1999, and the IEEE standard 802.11g (IEEE Std 802.11g-2003) supporting 5 GHz band was published on 2003. These standards are called legacy. Subsequently, the IEEE standard 802.11n (IEEE Std 802.11n-2009) for enhancements for higher throughput (HT) was published on 2009, and the IEEE standard 802.11ac (IEEE 802.11ac-2013) for enhancements for very high throughput (VHT) was published on 2013. Recently, a high efficiency WLAN (HEW) for enhancing the system throughput in high density scenarios is being developed by the IEEE 802.11ax task group.

In such WLAN scenarios, a transmitting device transmits a frame having a signal field including signaling information to allow a receiving device to successfully receive and decode the frame. When the signaling information is increased, the number of symbols included in the signal field is required to be increased. However, if the number of symbols included in the signal field is increased, a minimum length of a frame is increased such that the transmission efficiency is deteriorated. Accordingly, a scheme for additionally transmitting the signaling information is required without increasing the number of symbols.

SUMMARY

An embodiment of the present invention provides a signaling method for additionally transmitting signaling information.

According to another embodiment of the present invention, a signaling method is provided by a device in a wireless local area network. The method includes including signaling information in an address field, generating a MAC frame including the address field, and transmitting a PHY frame including a data field into which the MAC frame is inserted.

The address field may further include a compressed address into which an address of the device or an address of a device destined to receive the MAC frame is compressed.

The address field may further include a plurality of compressed addresses into which addresses of a plurality of devices destined to receive the MAC frame are respectively compressed.

The signaling information may include information on a number of the compressed addressed.

The signaling information may include signaling information dedicated to each of the plurality of devices.

All bytes of the address field may be assigned to the signaling information. The signaling information may include information on basic service set (BSS) to which the device belongs.

The information on the BSS may include a BSS color identifier for distinguishing neighboring BSSs.

The information on the BSS may include a partial association identifier generated by some bits of an association identifier of the device and an identifier of the BSS.

The PHY frame may further include an indication for indicating whether the signaling information is transmitted through the address field.

The indication may be included in the signaling information.

The MAC frame may further include a frame control field, and the indication may be carried by a predefined value of a subtype field in the frame control field.

The MAC frame may further include a frame control field, and the indication may be carried by a predefined bit of the frame control field.

The indication may be carried by a predefined bit of the address field.

The MAC frame may further include a duration field, and the indication may be carried by a predefined value of the duration field.

The data field may include a service field, and the indication may be carried by a predefined bit of the 8th to 16th bits in the service field.

The data field may include a service field, initial 7 bits of the service field may correspond to initial 7 bits of the scrambling sequence, and the indication may be carried by a predefined bit of the initial 7 bits of the scrambling sequence.

In this case, the predefined bit may include the 4th or 5th bit of the initial 7 bits of the scrambling sequence.

According to yet another embodiment of the present invention, a signaling method is provided by a device in a wireless local area network. The method includes receiving a PHY frame, extracting a MAC frame from a data field of the PHY frame, and extracting signaling information from an address field of the MAC frame.

The address field may further include a compressed address into which an address of the device or an address of a device transmitting the MAC frame is compressed.

All bytes of the address field may be assigned to the signaling information, and the signaling information may include information on BSS to which the device belongs.

According to still another embodiment of the present invention, a signaling apparatus of a device in a wireless local area network is provided. The device includes a processor and a transceiver. The processor includes signaling information in an address field, generates a MAC frame including the address field, and generates a PHY frame including a data field into which the MAC frame is inserted. The transceiver transmits the PHY frame.

According to further embodiment of the present invention, a signaling apparatus of a device in a wireless local area network is provided. The device includes a processor and a transceiver. The transceiver receives a PHY frame. The processor extracts a MAC frame from a data field of the PHY frame and extracts signaling information from an address field of the MAC frame.

BRIEF DESCRIPTION OF THE DRAWINGS

FIG. 5 is a schematic diagram explaining CSMA/CA based frame transmission procedure for avoiding collision between frames in a channel.

FIG. 6 schematically shows an example structure of a WLAN frame.

DETAILED DESCRIPTION OF THE EMBODIMENTS

Figure 1:
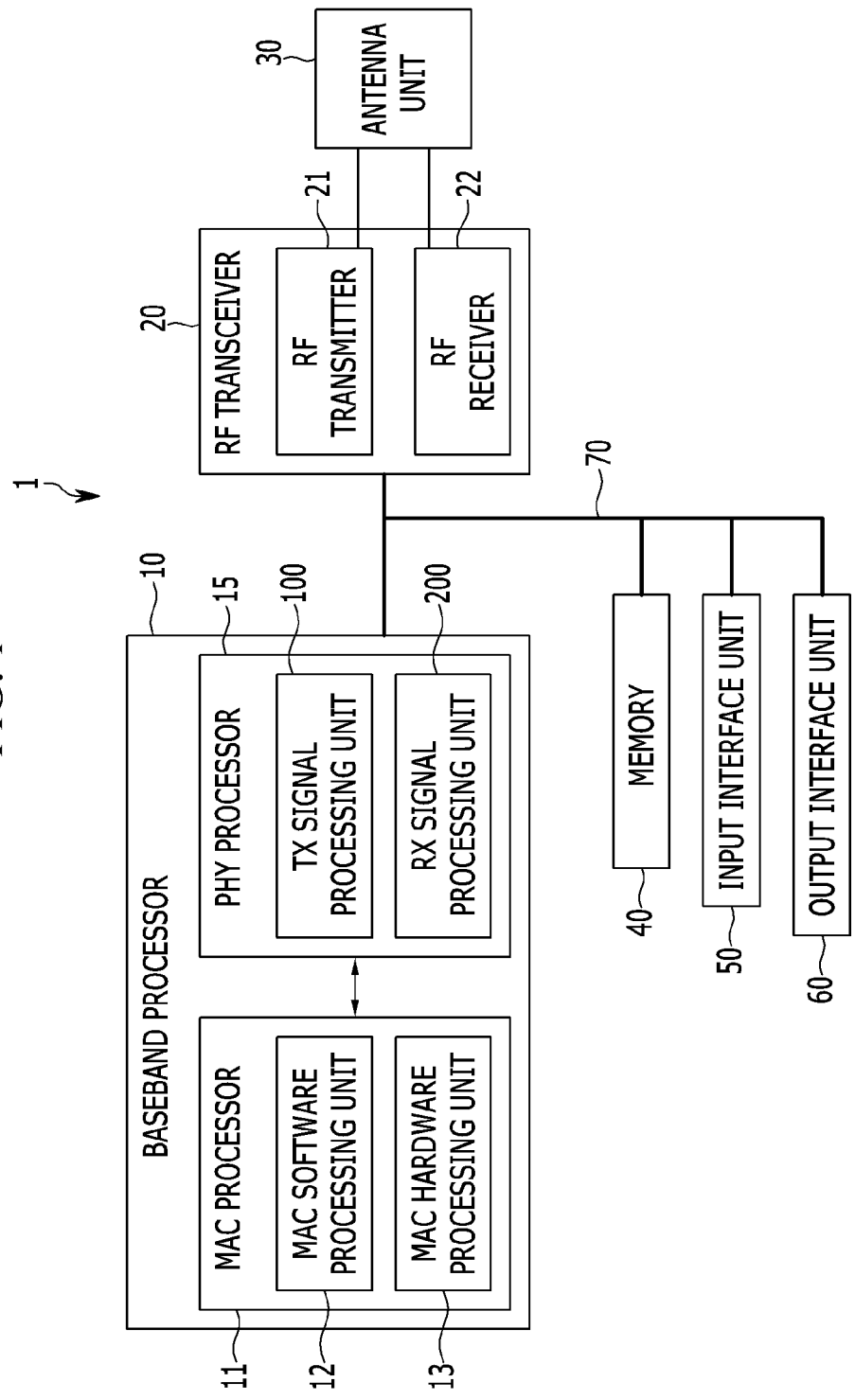
FIG. 1 is a schematic block diagram exemplifying a WLAN device.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In a wireless local area network (WLAN), a basic service set (BSS) includes a plurality of WLAN devices. The WLAN device may include a medium access control (MAC) layer and a physical (PHY) layer according to the IEEE (Institute of Electrical and Electronics Engineers) standard 802.11. In the plurality of WLAN devices, at least one WLAN device may be an access point and the other WLAN devices may be non-AP stations (non-AP STAs). Alternatively, all the plurality of WLAN devices may be non-AP STAs in Ad-hoc networking. In general, the AP STA and the non-AP STA may be collectively called the STA. However, for easy description, only the non-AP STA may be called the STA.

FIG. 1 is a schematic block diagram exemplifying a WLAN device.

Referring to FIG. 1, the WLAN device 1 includes a baseband processor 10, a radio frequency (RF) transceiver 20, an antenna unit 30, a memory 40, an input interface unit 50, an output interface unit 60, and a bus 70.

The baseband processor 10 performs baseband signal processing, and includes a MAC processor 11 and a PHY processor 15.

In one embodiment, the MAC processor 11 may include a MAC software processing unit 12 and a MAC hardware processing unit 13. The memory 40 may store software (hereinafter referred to as "MAC software") including at least some functions of the MAC layer. The MAC software processing unit 12 executes the MAC software to implement the some functions of the MAC layer, and the MAC hardware processing unit 13 may implement remaining functions of the MAC layer as hardware (hereinafter referred to "MAC hardware"). However, the MAC processor 11 is not limited to this.

The PHY processor 15 includes a transmitting signal processing unit 100 and a receiving signal processing unit 200.

The baseband processor 10, the memory 40, the input interface unit 50, and the output interface unit 60 may communicate with each other via the bus 70.

The RF transceiver 20 includes an RF transmitter 21 and an RF receiver 22.

The memory 40 may further store an operating system and applications. The input interface unit 50 receives information from a user, and the output interface unit 60 outputs information to the user.

The antenna unit 30 includes one or more antennas. When multiple-input multiple-output (MIMO) or multi-user MIMO (MU-MIMO) is used, the antenna unit 30 may include a plurality of antennas.

Figure 2:
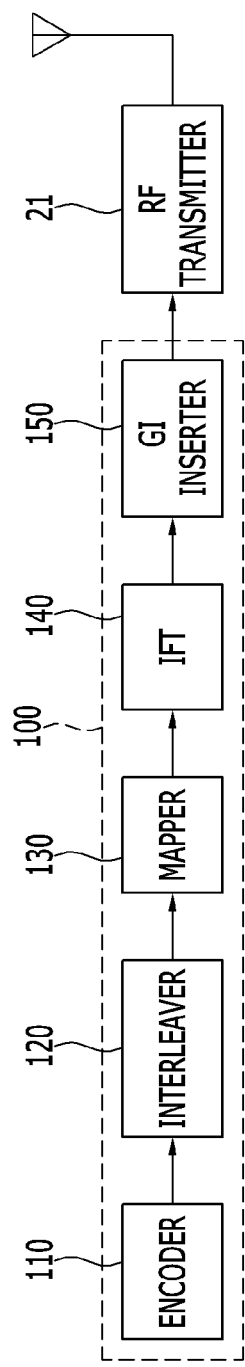
FIG. 2 is a schematic block diagram exemplifying a transmitting signal processor in a WLAN.

FIG. 2 is a schematic block diagram exemplifying a transmitting signal processor in a WLAN.

Referring to FIG. 2, a transmitting signal processing unit 100 includes an encoder 110, an interleaver 120, a mapper 130, an inverse Fourier transformer (IFT) 140, and a guard interval (GI) inserter 150.

The encoder 110 encodes input data. For example, the encoder 100 may be a forward error correction (FEC) encoder. The FEC encoder may include a binary convolutional code (BCC) encoder followed by a puncturing device, or may include a low-density parity-check (LDPC) encoder.

The transmitting signal processing unit 100 may further include a scrambler for scrambling the input data before the encoding to reduce the probability of long sequences of 0s or 1s. If BCC encoding is used in the encoder, the transmitting signal processing unit 100 may further include an encoder parser for demultiplexing the scrambled bits among a plurality of BCC encoders. If LDPC encoding is used in the encoder, the transmitting signal processing unit 100 may not use the encoder parser.

The interleaver 120 interleaves the bits of each stream output from the encoder to change order of bits. Interleaving may be applied only when BCC encoding is used. The mapper 130 maps the sequence of bits output from the interleaver to constellation points. If the LDPC encoding is used in the encoder, the mapper 130 may further perform LDPC tone mapping besides the constellation mapping.

When the MIMO or the MU-MIMO is used, the transmitting signal processing unit 100 may use a plurality of interleavers 120 and a plurality of mappers corresponding to the number of $N_{SS}$ of spatial streams. In this case, the transmitting signal processing unit 100 may further include a stream parser for dividing outputs of the BCC encoders or the LDPC encoder into blocks that are sent to different interleavers 120 or mappers 130. The transmitting signal processing unit 100 may further include a space-time block code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming.

The IFT 140 converts a block of the constellation points output from the mapper 130 or the spatial mapper to a time domain block (i.e., a symbol) by using an inverse discrete Fourier transform (IDFT) or an inverse fast Fourier transform (IFFT). If the STBC encoder and the spatial mapper are used, the inverse Fourier transformer 140 may be provided for each transmit chain.

When the MIMO or the MU-MIMO is used, the transmitting signal processing unit 100 may insert cyclic shift diversities (CSDs) to prevent unintentional beamforming. The CSD insertion may occur before or after the inverse Fourier transform. The CSD may be specified per transmit chain or may be specified per space-time stream. Alternatively, the CSD may be applied as a part of the spatial mapper.

When the MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When the MIMO or the MU-MIMO is used, the GI inserter 150 and the RF transmitter 21 may be provided for each transmit chain.

Figure 3:
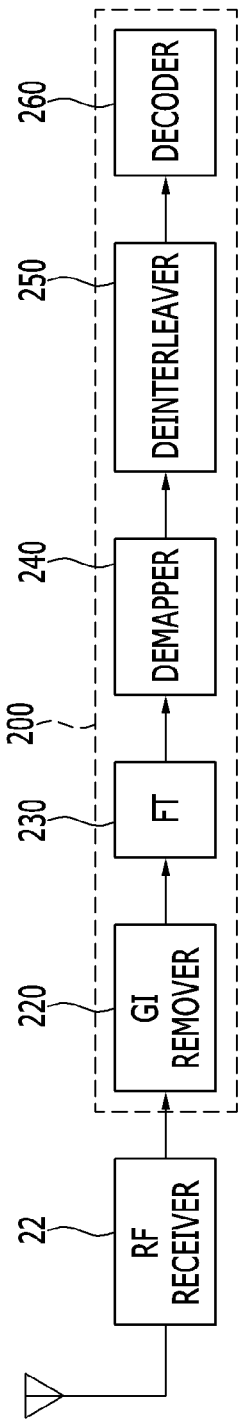
FIG. 3 is a schematic block diagram exemplifying a receiving signal processing unit in the WLAN.

FIG. 3 is a schematic block diagram exemplifying a receiving signal processing unit in the WLAN.

Referring to FIG. 3, a receiving signal processing unit 200 includes a GI remover 220, a Fourier transformer (FT) 230, a demapper 240, a deinterleaver 250, and a decoder 260.

An RF receiver 22 receives an RF signal via the antenna unit 30 and converts the RF signal into the symbols. The GI remover 220 removes the GI from the symbol. When the MIMO or the MU-MIMO is used, the RF receiver 22 and the GI remover 220 may be provided for each receive chain.

The FT 230 converts the symbol (i.e., the time domain block) into a block of the constellation points by using a discrete Fourier transform (DFT) or a fast Fourier transform (FFT). The Fourier transformer 230 may be provided for each receive chain.

When the MIMO or the MU-MIMO is used, the receiving signal processing unit 200 may a spatial demapper for converting the Fourier transformed receiver chains to constellation points of the space-time streams, and an STBC decoder for despreading the constellation points from the space-time streams into the spatial streams.

The demapper 240 demaps the constellation points output from the Fourier transformer 230 or the STBC decoder to the bit streams. If the LDPC encoding is used, the demapper 240 may further perform LDPC tone demapping before the constellation demapping. The deinterleaver 250 deinterleaves the bits of each stream output from the demapper 240. Deinterleaving may be applied only when BCC encoding is used.

When the MIMO or the MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining the streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder, the receiving signal processing unit 200 may further include an encoder deparser for multiplexing the data decoded by a plurality of BCC decoders. If LDPC decoding is used in the decoder, the receiving signal processing unit 100 may not use the encoder deparser.

Figure 4:
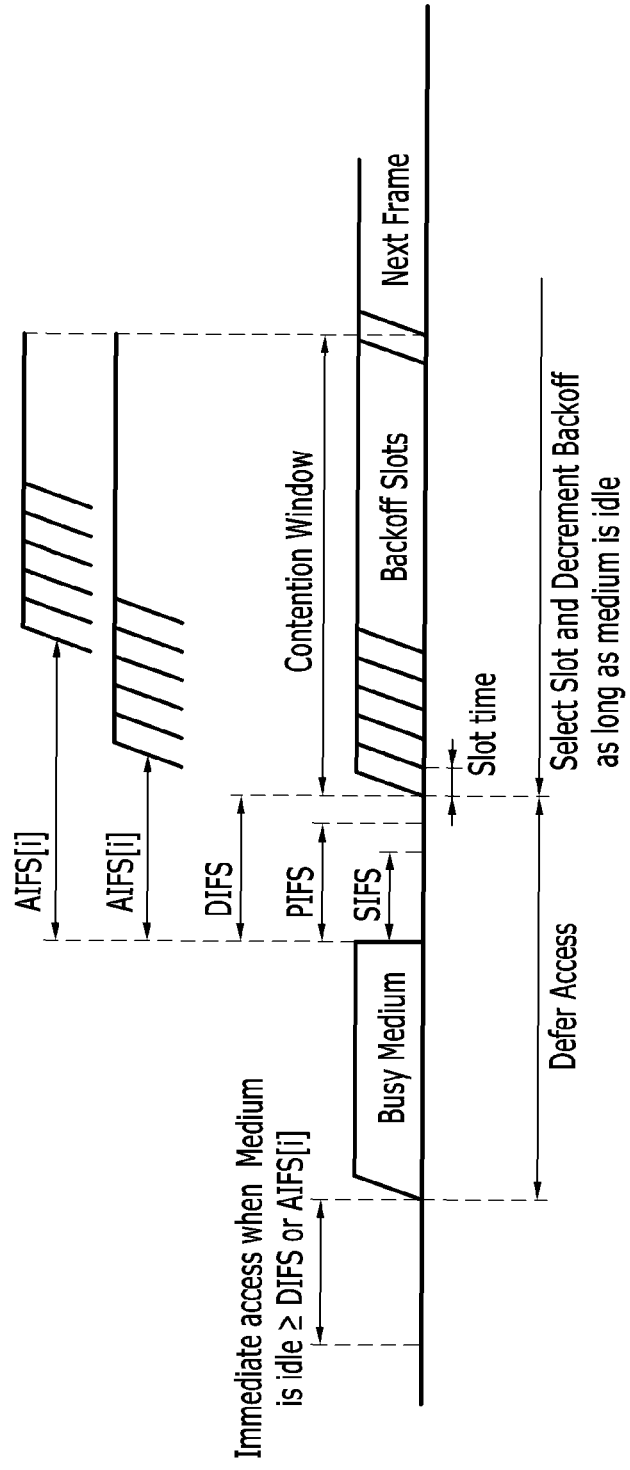
FIG. 4 exemplifies IFS relationships.

FIG. 4 exemplifies interframe space (IFS) relationships.

A data frame, a control frame, or a management frame may be exchanged between WLAN devices.

The data frame is used for transmission of data forwarded to a higher layer. The WLAN device transmits the data frame after performing backoff if a distributed coordination function IFS (DIFS) has elapsed from a time when the medium has been idle. The management frame is used for exchanging management information which is not forwarded to the higher layer. Subtype frames of the management frame include a beacon frame, an association request/response frame, a probe request/response frame, and an authentication request/response frame. The control frame is used for controlling access to the medium. Subtype frames of the control frame include a request to send (RTS) frame, a clear to send (CTS) frame, and an acknowledgement (ACK) frame. In the case that the control frame is not a response frame of the other frame, the WLAN device transmits the control frame after performing backoff if the DIFS has elapsed. In the case that the control frame is the response frame of the other frame, the WLAN device transmits the control frame without performing backoff if a short IFS (SIFS) has elapsed. The type and subtype of frame may be identified by a type field and a subtype field in a frame control field.

On the other hand, a Quality of Service (QoS) STA may transmit the frame after performing backoff if an arbitration IFS (AIFS) for access category (AC), i.e., AIFS[AC], has elapsed. In this case, the data frame, the management frame, or the control frame which is not the response frame may use the AIFC[AC].

FIG. 5 is a schematic diagram explaining a CSMA (carrier sense multiple access)/CA (collision avoidance) based frame transmission procedure for avoiding collision between frames in a channel.

Referring to FIG. 5, STA1 is a transmit WLAN device for transmitting data, STA2 is a receive WLAN device for receiving the data, and STA3 is a WLAN device which may be located at an area where a frame transmitted from the STA1 and/or a frame transmitted from the STA2 can be received by the WLAN device.

The STA1 may determine whether the channel is busy by carrier sensing. The STA1 may determine the channel occupation based on an energy level on the channel or correlation of signals in the channel, or may determine the channel occupation by using a network allocation vector (NAV) timer.

When determining that the channel is not used by other devices during DIFS (that is, the channel is idle), the STA1 may transmit an RTS frame to the STA2 after performing backoff. Upon receiving the RTS frame, the STA2 may transmit a CTS frame as a response of the CTS frame after SIFS.

When the STA3 receives the RTS frame, it may set the NAV timer for a transmission duration of subsequently transmitted frames (for example, a duration of SIFS+CTS frame duration+SIFS+data frame duration+SIFS+ACK frame duration) by using duration information included in the RTS frame. When the STA3 receives the CTS frame, it may set the NAV timer for a transmission duration of subsequently transmitted frames (for example, a duration of SIFS+data frame duration+SIFS+ACK frame duration) by using duration information included in the RTS frame. Upon receiving a new frame before the NAV timer expires, the STA3 may update the NAV timer by using duration information included in the new frame. The STA3 does not attempt to access the channel until the NAV timer expires.

When the STA1 receives the CTS frame from the STA2, it may transmit a data frame to the STA2 after SIFS elapses from a time when the CTS frame has been completely received. Upon successfully receiving the data frame, the STA2 may transmit an ACK frame as a response of the data frame after SIFS elapses.

When the NAV timer expires, the STA3 may determine whether the channel is busy by the carrier sensing. Upon determining that the channel is not used by the other devices during DIFS after the NAV timer has expired, the STA3 may attempt the channel access after a contention window according to random backoff elapses.

FIG. 6 schematically shows an example structure of a WLAN frame.

Referring to FIG. 6, a WLAN frame, particularly a MAC frame, includes a MAC header 610, a frame body field 620, and a frame check sequence (FCS) field 630.

The MAC header 610 includes a frame control field 611, a duration/ID field 612, at least one address field 613, 614, 615, and 617, and a sequence control field 616. The at least one address field 613, 614, 615, and 617 may include four address fields (address 1, address 2, address 3, and address 4), and at least part of the four address fields may be omitted according to frame type and subtype. The frame body field 620 is a variable length field that includes information specific to the frame type and may be omitted according to the frame type and subtype. The FCS field 630 is located at an end of the frame and includes a cyclic redundancy check (CRC), for example a 32-bit CRC.

The frame control field 611 includes a type field and a subtype field. The type and subtype fields identify a function of the frame. The type field identifies any one of three types including control, data, and management. Each of the types has several predefined subtypes shown in Table 1, and the subtype is identified by the subtype field.

TABLE 1

| Type value b3 b2 | Type description | Subtype value b7 b6 b5 b4 | Subtype description |
|---|---|---|---|
| 00 | Management | 0000 | Association request |
| 00 | Management | 0001 | Association response |
| 00 | Management | 0010 | Reassociation request |
| 00 | Management | 0011 | Reassociation response |
| 00 | Management | 0100 | Probe request |
| 00 | Management | 0101 | Probe response |
| 00 | Management | 0110 | Timing Advertisement |
| 00 | Management | 0111 | Reserved |
| 00 | Management | 1000 | Beacon |
| 00 | Management | 1001 | ATIM |
| 00 | Management | 1010 | Disassociation |
| 00 | Management | 1011 | Authentication |
| 00 | Management | 1100 | Deauthentication |
| 00 | Management | 1101 | Action |
| 00 | Management | 1110 | Action No Ack |
| 00 | Management | 1111 | Reserved |
| 01 | Control | 0000-0011 | Reserved |
| 01 | Control | 0100 | Beamforming Report Poll |

TABLE 1-continued

| Type value b3 b2 | Type description | Subtype value b7 b6 b5 b4 | Subtype description |
|---|---|---|---|
| 01 | Control | 0101 | VHT NDP Announcement |
| 01 | Control | 0111 | Control Wrapper |
| 01 | Control | 1000 | Block Ack Request (BlockAckReq) |
| 01 | Control | 1001 | Block Ack (BlockAck) |
| 01 | Control | 1010 | PS-Poll |
| 01 | Control | 1011 | RTS |
| 01 | Control | 1100 | CTS |
| 01 | Control | 1101 | ACK |
| 01 | Control | 1110 | CF-End |
| 01 | Control | 1111 | CF-End + CF-Ack |
| 10 | Data | 0000 | Data |
| 10 | Data | 0001 | Data + CF-Ack |
| 10 | Data | 0010 | Data + CF-Poll |
| 10 | Data | 0011 | Data + CF-Ack + CF-Poll |
| 10 | Data | 0100 | Null (no data) |
| 10 | Data | 0101 | CF-Ack (no data) |
| 10 | Data | 0110 | CF-Poll (no data) |
| 10 | Data | 0111 | CF-Ack + CF-Poll (no data) |
| 10 | Data | 1000 | QoS Data |
| 10 | Data | 1001 | QoS Data + CF-Ack |
| 10 | Data | 1010 | QoS Data + CF-Poll |
| 10 | Data | 1011 | QoS Data + CF-Ack + CF-Poll |
| 10 | Data | 1100 | QoS Null (no data) |
| 10 | Data | 1101 | Reserved |
| 10 | Data | 1110 | QoS CF-Poll (no data) |
| 10 | Data | 1111 | QoS CF-Ack + CF-Poll (no data) |
| 11 | Reserved | 0000-1111 | Reserved |

The frame control field 611 may further include other information. In some embodiments, the frame control field 611 may include To DS (distribution system) field and From DS field. The To DS field is set to '1' in data frames destined for the DS. The From DS field is set to '1' in data frames exiting the DS.

The duration/ID field 612 may be for example 16 bits in length. The contents of the duration/ID field 612 vary with the frame type and subtype. The contents of the duration/ID field 612 may vary with whether the frame is transmitted during a CFP (contention-free period), and with QoS (quality of service) capabilities of a transmitting device. In some embodiments, the duration/ID field 612 may include information as follows.

(1) In control frames of subtype PS-Poll, the duration/ID field carries an association identifier (AID) of a device that transmitted the frame in the 14 least significant bits (LSBs), and the 2 most significant bits (MSBs) both set to 1. The value of the AID is in the range 1 to 2007.

(2) In frames transmitted by a PC (point coordinator) and non-QoS devices, during the CFP, the duration/ID field is set to a fixed value of 32768.

(3) In all other frames sent by non-QoS devices and control frames sent by QoS devices, the duration/ID field includes a duration value as defined for each frame type.

(4) In data and management frames sent by QoS devices, the duration/ID field includes a duration value as defined for each frame type.

In the third and fourth cases, the duration/ID field is called a duration field.

For example, the duration/ID field 612 may be defined as Table 2.

TABLE 2

| Bits 0-13 | Bit 14 | Bit 15 | Usage |
|---|---|---|---|
| 0-32767 | | 0 | Duration value (in microseconds) within all frames other than PS-Poll frames transmitted during the CP, and under HCF (hybrid coordination function) for frames transmitted during the CFP |
| 0 | 0 | 1 | Fixed value under point coordination function (PCF) within frames transmitted during the CFP |
| 1-16383 | 0 | 1 | Reserved |
| 0 | 1 | 1 | Reserved |
| 1-2007 | 1 | 1 | AID in PS-Poll frame |
| 2008-16383 | 1 | 1 | Reserved |

In some embodiments, the address fields may include four address fields 613, 614, 615, and 617, and each address field may have a 48-bit MAC address. The address fields 613, 614, 615, and 617 include at least one of a BSS identifier (BSSID), a source address (SA), a destination address (DA), a receiver address (RA), and a transmitter address (TA).

The BSSID is a 48-bit address of the AP in a BSS or a 46-bit random number in an independent BSS (IBSS). The SA identifies an originator of a MAC service data unit (MSDU) being transmitted. The DA is an individual MAC address of an entity to which the MSDU is to be ultimately delivered. The RA is an address of an immediate recipient on a wireless medium. The TA is an address of a device that transmitted onto the wireless medium.

Table 3 explains a usage of the To DA and From DS fields in conjunction with the four address fields (address 1, address 2, address 3, and address 4).

TABLE 3

| To DS | From DS | Address 1 | Address 2 | Address 3 | Address 4 | Meaning |
|---|---|---|---|---|---|---|
| 0 | 0 | DA | SA | BSSID | N/A | Data frame from device to device within a BSS |
| 0 | 1 | DA | BSSID | Source Address | N/A | Data frame exiting a DS |

TABLE 3-continued

| To DS | From DS | Address 1 | Address 2 | Address 3 | Address 4 | Meaning |
|---|---|---|---|---|---|---|
| 1 | 0 | BSSID | SA | DA | N/A | Data frame destined for the DS |
| 1 | 1 | RA | TA | DA | SA | Wireless DS (WDS) frame being distributed from AP to AP |

To DS=0 and From DS=0. This corresponds to a case when MSDUs do not exit the BSS, that is, the source and destination devices are within the same BSS.

To DS=0 and From DS=1. This corresponds to a case when a frame is transferred from the DS to an individual device in the BSS. The devices within the BSS look at the address 1 field to determine if they are the recipients, the address 2 field includes an address to where an acknowledgement (ACK) frame is to be sent, and the address 3 field includes an address of an MSDU originator.

To DS=1 and From DS=0. This corresponds to a case when a device wants to transfer a frame on to the DS. All devices in the BSS look at the address 1 field to check whether the frame is intended for them. As the frame needs to traverse the DS and an AP is responsible for facilitating this, the address 1 field includes an address of the AP. The address 2 field includes an address that the ACK frame is to be addressed to. The address 3 field includes an address of a final recipient of the frame.

To DS=1 and From DS=1. This case applies when the DS is a WDS. The address 1 field includes a receiver address in an AP of a next immediate recipient of the frame in the DS. The address 2 field includes an address to which the ACK frame is to be addressed. The address 3 field includes an address of a final recipient of the frame in the BSS, and the address 4 field includes an originator of the frame.

The MAC address has two types of an individual address and a group address. The individual address is an address assigned to a particular device on the network. The group address is a multi-destination address which may be in use by one or more devices on a given network. The two kinds of group addresses are a multicast-group address and a broadcast address.

The BSSID field is a 48-bit field of the same format as the MAC address. The BSSID field uniquely identifies each BSS. A value of the BSSID field, in an infrastructure BSS, is the MAC address currently in use by the device in the AP of the BSS.

The DA field contains an individual or group address that identifies an MAC entity or entities intended as the final recipient(s) of an MSDU (or fragment thereof) or aggregate MSDU (A-MSDU) included in the frame body field 620.

The SA field includes an individual address that identifies the MAC entity from which the transfer of the MSDU (or fragment thereof) or A-MSDU included in the frame body field 620 has been initiated.

The RA field includes an individual or group address that identifies an intended immediate recipient device(s), on the WM, for the information included in the frame body field 620.

The TA field includes an individual address that identifies the device which has transmitted, onto the WM, the MPDU included in the frame body field 620.

The sequence control field 614 is divided into two fields of a sequence number and fragment number. The sequence number may be 12 bits and the fragment number may be 4 bits. The sequence number is not used in the ACK frame.

The sequence number is present in an MSDU and a MAC management data protocol unit (MMPDU) and is used to detect a duplicate frame. The fragment number is set to 0 in the first fragment and is incremented by one in every subsequent fragment. The fragment number remains constant in retransmissions of fragments.

The frame body field 620 includes information specific to individual frame type and subtype. The minimum frame body is zero octets.

The FCS field 630 includes for example the 32-bit CRC. The FCS is calculated over all the fields of the MAC header 610 and the frame body field 620.

Next, a format of an individual frame type is described.

First, a format of a control frame is described with reference to FIG. 7 and FIG. 8.

Figure 7:
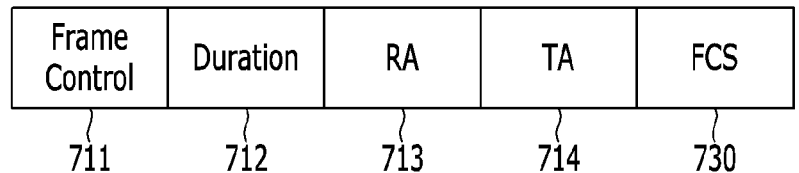
FIG. 7 shows an example format of an RTS frame in a WLAN.
Figure 8:
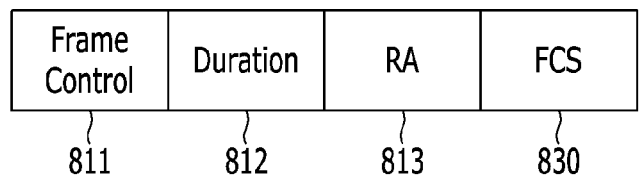
FIG. 8 shows an example format of a CTS frame in a WLAN.

FIG. 7 shows an example format of an RTS frame in a WLAN, and FIG. 8 shows an example format of a CTS frame in a WLAN.

Referring to FIG. 7, an RTS frame of control frames includes a frame control field 711, a duration field 712, an RA field 713, a TA field 714, and an FCS field 730.

For all RTS frames sent by non-QoS devices, a duration value is the time, in microseconds, required to transmit a pending data or management frame, plus one CTS frame, plus one ACK frame, plus three SIFS intervals. If the calculated duration includes a fractional microsecond, that value is rounded up to a next higher integer.

The RA field 713 of the RTS frame is an address of a device, on a WM, that is an intended immediate recipient of the pending data or management frame or RTS frame. The TA field 714 is an address of a device transmitting the RTS frame.

Referring to FIG. 8, a CTS frame of control frames includes a frame control field 811, a duration field 812, an RA field 813, and an FCS field 830.

When the CTS frame follows an RTS frame, the RA field 813 of the CTS frame is copied from the TA field of an immediately previous RTS frame to which the CTS frame is a response. When the CTS frame is the first frame in a frame exchange, the RA field 813 is set to an MAC address of a transmitter.

For all CTS frames transmitted by a non-QoS device in response to RTS frames, a duration value is a value obtained from a duration field of an immediately previous RTS frame, minus the time, in microseconds, required to transmit the CTS frame and its SIFS interval. If the calculated duration includes a fractional microsecond, that value is rounded up to a next higher integer.

At a non-QoS device, if the CTS frame is the first frame in an exchange and a pending data or management frame requires an acknowledgment, a duration value is a time, in microseconds, required to transmit the pending data or management frame, plus two SIFS intervals plus one ACK frame. At a non-QoS device, if the CTS frame is the first frame in the exchange and the pending data or management frame does not require the acknowledgment, the duration value is the time, in microseconds, required to transmit the pending data or management frame, plus one SIFS interval. If the calculated duration includes a fractional microsecond, that value is rounded up to a next higher integer.

An ACK frame of control frames has the same format as the CTS frame shown in FIG. 8.

The RA field 813 of the ACK frame is copied from the address 2 field of an immediately previous data, management, block ACK request (BlockAckReq) control, block ACK (BlockAck) control, or PS-Poll control frame.

In ACK frames sent by non-QoS devices, a duration value is a value obtained from the duration/ID field of the immediately previous data, management, PS-Poll, BlockAckReq, or BlockAck frame minus the time, in microseconds, required to transmit the ACK frame and its SIFS interval. If the calculated duration includes a fractional microsecond, that value is rounded up to a next higher integer.

Next, a management frame is described.

Figure 9:
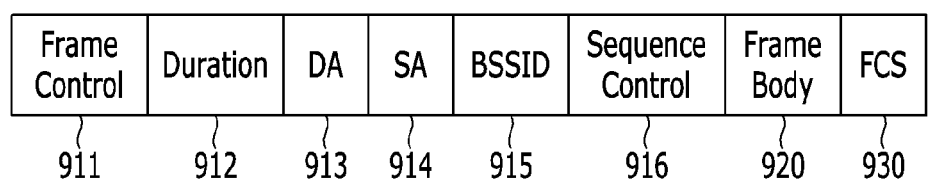
FIG. 9 shows an example format a management frame in a WLAN.

FIG. 9 shows an example format a management frame in a WLAN.

Referring to FIG. 9, a management frame includes a frame control field 911, a duration field 912, a DA field 913, an SA field 914, a BSSID field 915, a sequence control field 916, a frame body field 920, and an FCS field 930.

The management frames include beacon, ATIM (announcement traffic indication message), association request, reassociation request, disassociation, authentication, and deauthentication frames.

As described above, the DA field 913 is set to a destination address that is an individual MAC address of an entity to which an MSDU is to be ultimately delivered, and the SA field 914 is set to a source address that is an individual MAC address of an originator of the MSDU. The BSSID field 915 is set to a BSSID.

Figure 10:
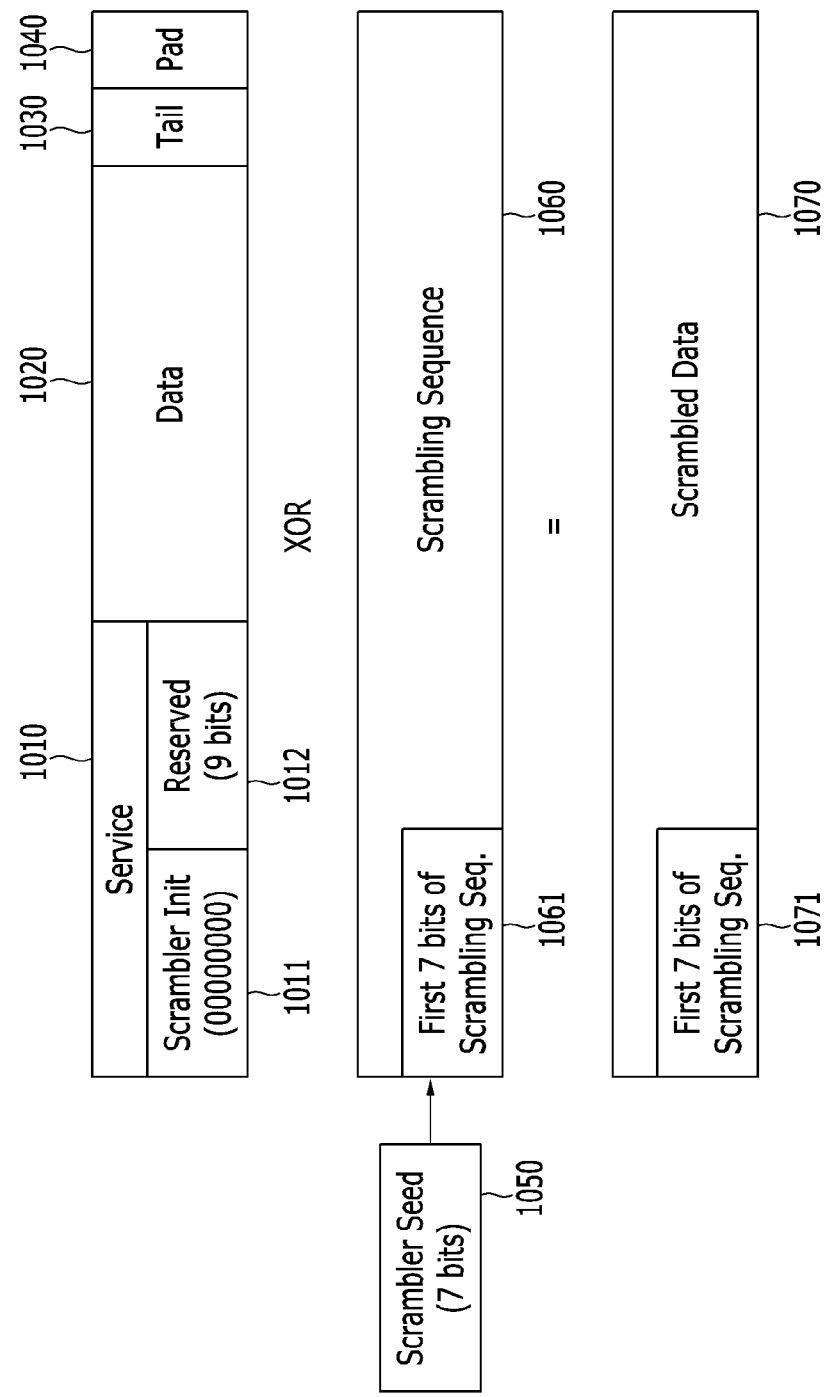
FIG. 10 exemplifies a structure of a data field in a WLAN.

FIG. 10 exemplifies a structure of a data field in a WLAN.

The MAC frame is inserted into a data field of a PHY frame, for example a physical layer convergence procedure (PLCP) frame. As shown in FIG. 10, the data field includes a service field 1010, data bits 1020, and tail bits 1030, and further includes, if necessary, pad bits 1040. The service field 1010 may correspond to the first 16 bits of the data field. The first 7 bits of the service field 1010 may be scrambler initialization bits 1011. The scrambler initialization bits may be used to synchronize a descrambler and may be set to zero to enable estimation of an initial state of a scrambler in a receiver. The remaining 9 bits 1012 may be reserved and also set to zero.

A length 127 frame synchronization scrambler that uses a generator polynomial $G(D)=D^7+D^4+1$ may be used in the WLAN. The generator polynomial generates a scrambling sequence 1060 by repeatedly generating a 127-bit sequence from a 7-bit scrambler seed 1050. Accordingly, the scrambler seed 1050 is one-to-one mapped to the first 7 bits 1061 of the scrambling sequence 1060. Since the scrambler initialization bits are set to "0000000," the first 7 bits 1071 of data 1070 that are outputted by scrambling the data field before being scrambled are equal to the first 7 bits 1061 of the scrambling sequence 1060. Therefore, a receiving device can determine the first 7 bits of the data field in the received frame as the scrambler seed and generate the same scrambling sequence as a transmitting device such that it can descramble the data field.

Next, operations of an RTS frame and a CTS frame in a WLAN.

Figure 11:
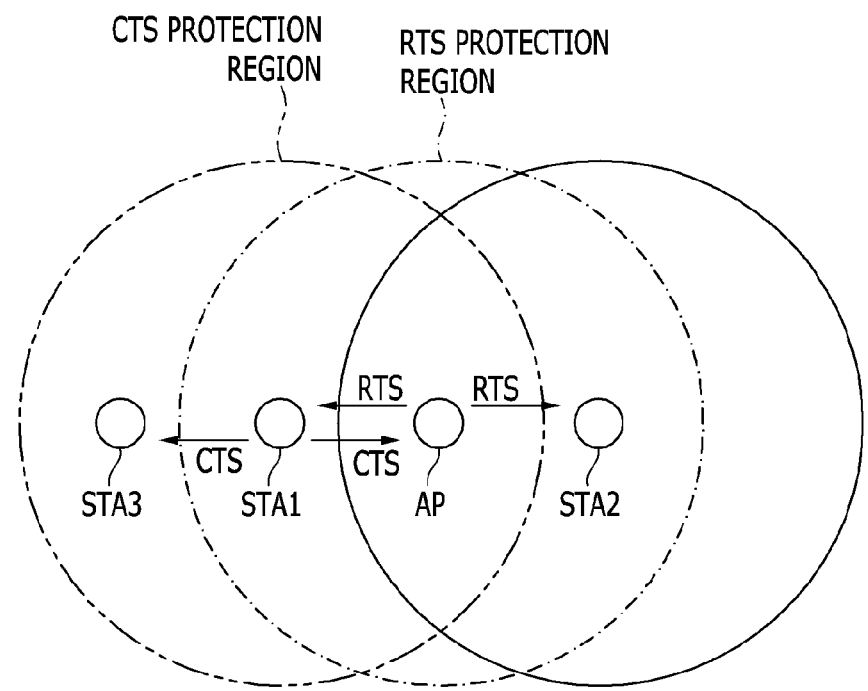
FIG. 11 and FIG. 12 show an example of downlink transmission in a WLAN.
Figure 12:
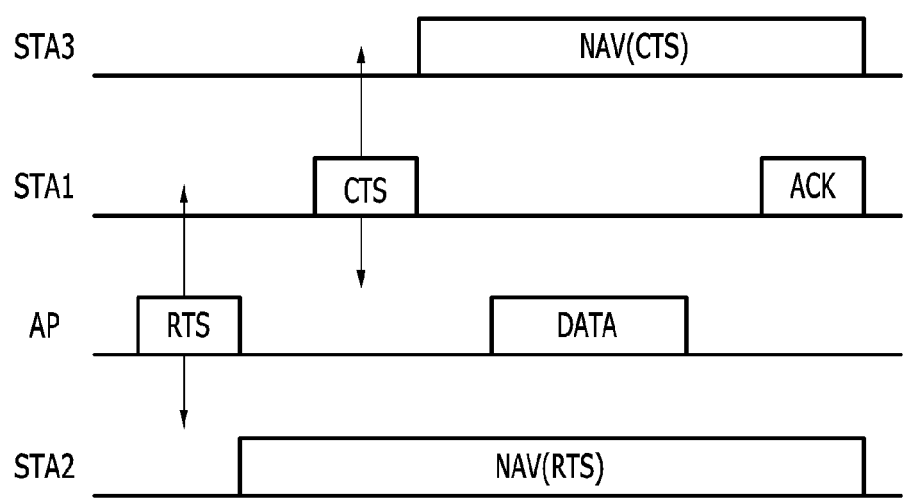
Figure 13:
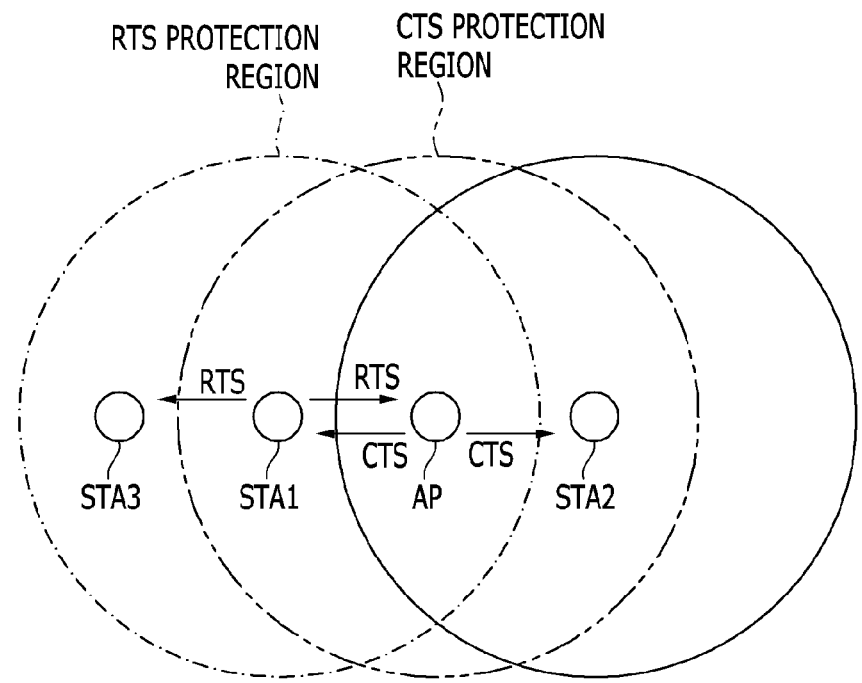
FIG. 13 and FIG. 14 show an example of uplink transmission in a WLAN.
Figure 14:
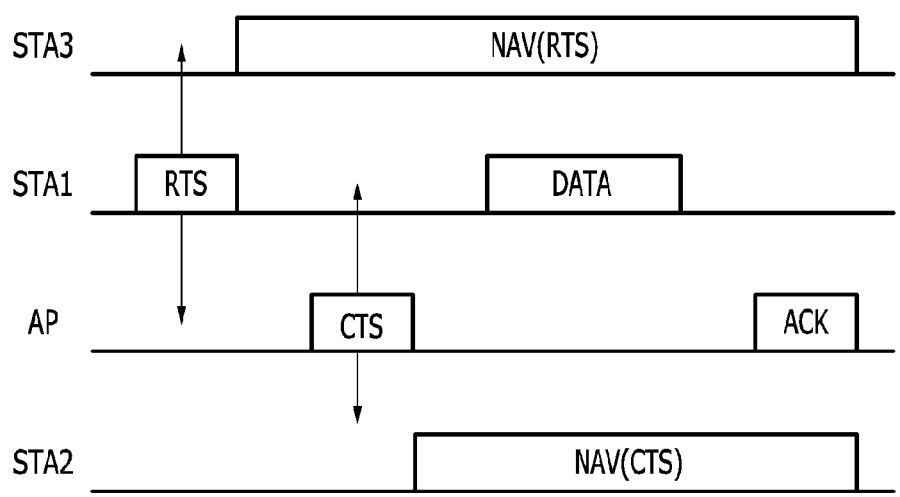
Figure 15:
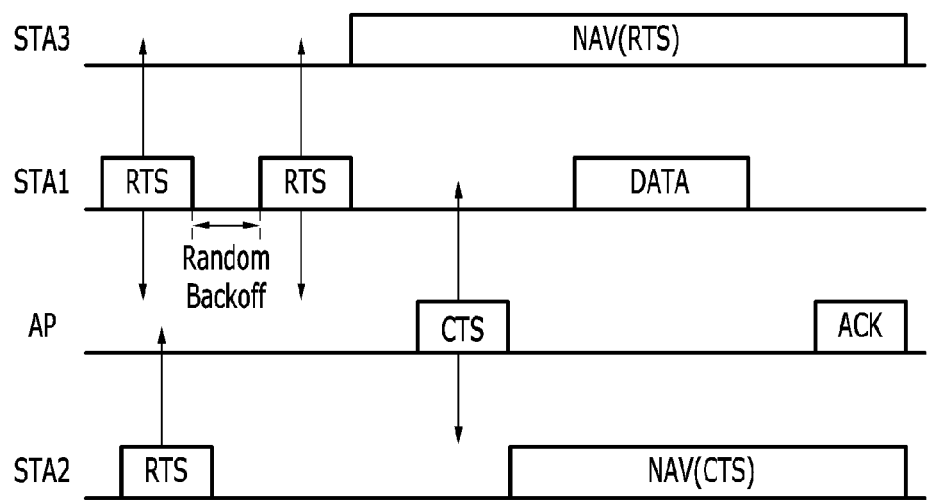
FIG. 15 shows another example of uplink transmission in a WLAN.

FIG. 11 and FIG. 12 show an example of downlink transmission in a WLAN, FIG. 13 and FIG. 14 show an example of uplink transmission in a WLAN, and FIG. 15 shows another example of uplink transmission in a WLAN. It is assumed in FIG. 11 to FIG. 15 that a device AP is an access point and devices STA1, STA2, and STA3 are non-AP stations.

Referring to FIG. 11 and FIG. 12, when a transmitting device AP has downlink data to be transmitted to a receiving device STA1, the transmitting device AP transmits an RTS frame to notify this. An RA field of the RTS frame is set to an address of a receiving device STA1. The receiving device STA1 determines that its own address matches the RA field of the RTS frame. Another device STA2 having received the RTS frame updates a NAV based on a duration field of the RTS frame when its own address does not match the RA field of the RTS frame. That is, devices included within an RTS protection region that is the coverage of the transmitting device AP can update the NAV based on the duration field of the RTS frame.

The receiving device STA1 determining that its own address matches the RA field of the RTS frame transmits a CTS frame after a SIFS interval in order to notify the transmitting device AP of available transmission. An RA field of the CTS frame is copied from the TA field of the RTS frame. The transmitting device AP determines that its own address matches the RA field of the CTS frame. Another device STA3 having received the CTS frame updates a NAV based on a duration field of the CTS frame when its own address does not match the RA field of the CTS frame. That is, devices included within a CTS protection region that is the coverage of the receiving device STA1 can update the NAV based on the duration field of the CTS frame.

The transmitting device AP having received the CTS frame transmits a data frame after the SIFS interval, and the receiving device STA1 having received the data frame transmits an ACK frame after the SIFS interval.

Referring to FIG. 13 and FIG. 14, when a transmitting device STA1 has uplink data to be transmitted to a receiving device AP, the transmitting device STA1 transmits an RTS frame. An RA field of the RTS frame is set to an address of a receiving device AP. The receiving device AP determines that its own address matches the RA field of the RTS frame. Another device STA3 having received the RTS frame updates a NAV based on a duration field of the RTS frame when its own address does not match the RA field of the RTS frame. That is, devices included within an RTS protection region that is the coverage of the transmitting device STA1 can update the NAV based on the duration field of the RTS frame.

The receiving device AP determining that its own address matches the RA field of the RTS frame transmits a CTS frame after a SIFS interval. An RA field of the CTS frame is copied from the TA field of the RTS frame. The transmitting device STA1 determines that its own address matches the RA field of the CTS frame. Another device STA2 having received the CTS frame updates a NAV based on a duration field of the CTS frame when its own address does not match the RA field of the CTS frame. That is, devices included within a CTS protection region that is the coverage of the receiving device AP can update the NAV based on the duration field of the CTS frame.

The transmitting device STA1 having received the CTS frame transmits a data frame after the SIFS interval, and the receiving device AP having received the data frame transmits an ACK frame after the SIFS interval.

As shown in FIG. 15, a device STA1 and a device STA2 may transmit RTS frames at the same time. In this case, the RTS frames from the two devices STA1 and STA2 collide at a receiving device. Accordingly, the receiving device AP does not transmit a CTS frame. Each of the devices STA1 and STA2 that fails to receive the CTS frame retransmits the RTS frames after performing a backoff procedure. Accordingly, if the receiving device AP successfully receives the RTS frame retransmitted from the device STA1, it transmits the CTS frame whose RA field is copied from the TA field of the RTS frame from the device STA1.

Now, a signaling method in a wireless communication network according to various embodiments of the present invention is described with reference to the drawings. The wireless communication network according to various embodiments of the present invention may be a WLAN. Particularly, the wireless communication network according to various embodiments of the present invention may be a new version WLAN. One example of the new version WLAN is a high efficiency WLAN (HEW) that is being developed by the IEEE 802.11ax task group. Hereinafter, the wireless communication network according to various embodiments of the present invention is assumed as the WLAN, particularly the HEW, for convenience.

Figure 16:
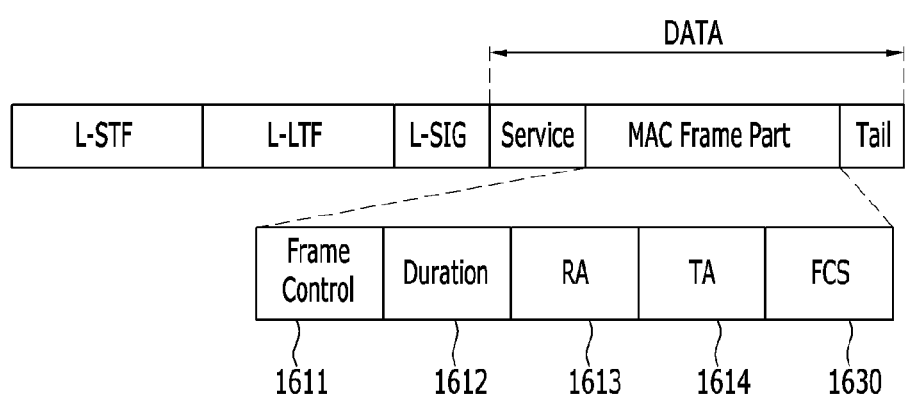
FIG. 16 exemplifies a structure of a request frame in a WLAN according to an embodiment of the present invention.
Figure 17:
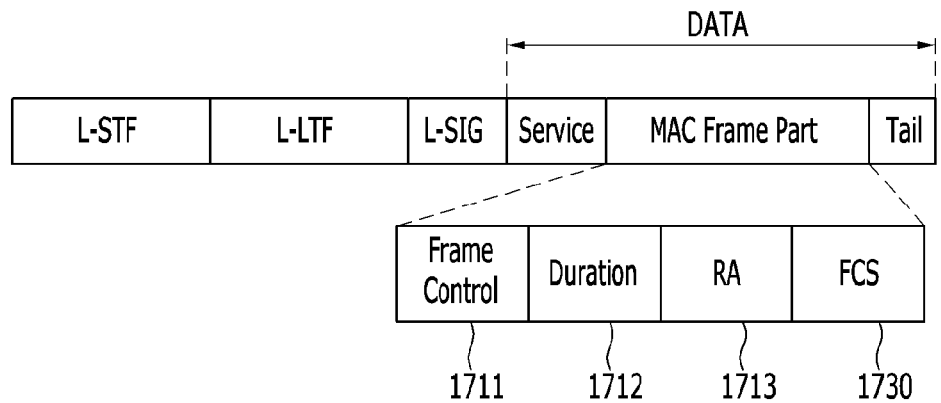
FIG. 17 exemplifies a structure of a response frame in a WLAN according to an embodiment of the present invention.

FIG. 16 exemplifies a structure of a request frame in a WLAN according to an embodiment of the present invention, and FIG. 17 exemplifies a structure of a response frame in a WLAN according to an embodiment of the present invention. The frame structures shown in FIG. 16 and FIG. 17 are PHY frame structures, for example PLCP frame structures.

Referring to FIG. 16, a request frame includes a legacy short training field (L-STF), a legacy long training field (L-LTF), a legacy signal field (L-SIG), and a data field. The data field includes a service field, a MAC frame part, and tail bits, and further includes, if necessary, pad bits. The MAC frame part includes a frame control field 1611, a duration field 1612, address fields, and an FCS field 1630. The address fields may include an RA field 1613 and a TA field 1614.

Referring to FIG. 17, a response frame on the request frame includes a legacy short training field (L-STF), a legacy long training field (L-LTF), a legacy signal field (L-SIG), and a data field. The data field includes a service field, a MAC frame part, and tail bits, and further includes, if necessary, pad bits. The MAC frame part includes a frame control field 1711, a duration field 1712, address field 1713, and an FCS field 1730. The address field may include an RA field 1713.

An example of the request frame may be an RTS frame, and an example of the response frame may be a CTS frame.

A receiving device destined to receive the request frame, may determine whether its own address matches the RA field 1613 of the request frame. Other devices having received the request frame may determine whether their own addresses do not match the RA field 1613 of the request frame. A transmitting device determines whether its address matches the RA field 1713 of the response frame. Other devices having received the response frame determine whether their addresses do not match the RA field 1713 of the response frame. The TA field 1614 of the request frame may be copied to the RA field 1713 of the response frame. Accordingly, the device having received the request frame or the response frame determines whether its address matches the RA field 1613 or 1713 or the TA field 1614.

As such, since the address has the characteristic of an identifier (ID), an embodiment of the present invention uses a concept of a compressed ID. That is, according to an embodiment of the present invention, a compressed address is input to the RA field or TA field, and remaining bits of the RA field or TA field are used to carry signaling information.

FIG. 18, FIG. 19, FIG. 20, and FIG. 21 exemplify an address field included in a frame of a WLAN according to various embodiments of the present invention. In some embodiments, an address field may be included in the request frame or the response frame described above. In some embodiments, the address field may be an RA field or a TA field.

Figure 18:
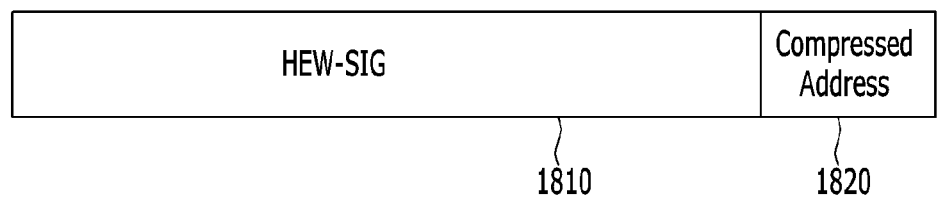
FIG. 18, FIG. 19, FIG. 20, and FIG. 21 exemplify an address field included in a frame of a WLAN according to various embodiments of the present invention.

Referring to FIG. 18, an address field according to an embodiment includes a signal (HEW-SIG) 1810 and compressed address field 1820. The HEW-SIG 1810 carries signaling information, and the compressed address field 1820 carries a compressed address. The signaling information is information necessary for signaling between devices to which a WLAN according to an embodiment of the present invention is applied, for example HEW devices. The compressed address is an address for identifying a device and may be for example an address into which a MAC address is compressed. Particularly, the compressed address may be an address into which an address of a device destined to receive a frame including the address field or an address of a device transmitting the frame is compressed.

For example, when the address field uses 6 bytes, the address may be compressed into a compressed address of N bytes and remaining (6−N) bytes may be used to carry the signaling information.

In some embodiments, the HEW-SIG 1810 may further include a signaling indication for indicating whether a transmission mode of the request frame or response frame is a signaling transmission mode for carrying the signaling information through the address field.

In some embodiments, the compressed address field 1820 may be positioned at a beginning of the address field and the HEW-SIG 1810 may follow the compressed address field 1820, differently from FIG. 18.

Figure 19:
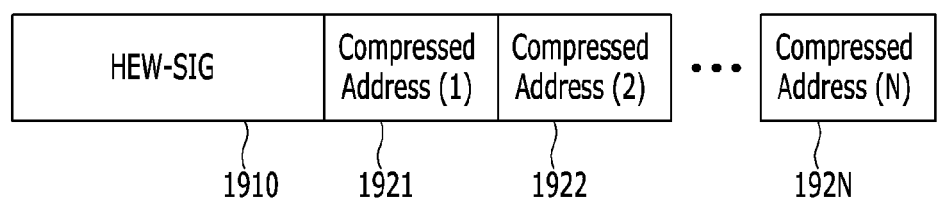

Referring to FIG. 19, an address field according to another embodiment includes a signal field (HEW-SIG) 1910 and a plurality of compressed address fields 1921, 1922, . . . , 192N.

The plurality of compressed address fields 1921 to 192N may correspond to a plurality of HEW devices destined to receive a frame including the compressed address fields 1921 to 192N, respectively. Each of the compressed address fields 1921 to 192N may include an address into which an address of the corresponding HEW device is compressed.

The HEW-SIG 1910 carries signaling information for the HEW devices. In some embodiments, the HEW-SIG 1910 may further include information on the number of compressed address fields 1921 to 192N, i.e., the number of compressed addresses.

Figure 20:
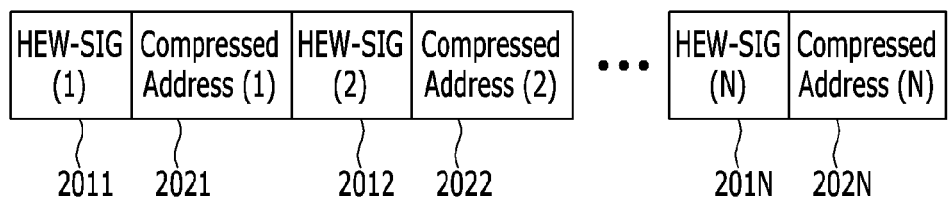

Referring to FIG. 20, an address field according to yet another embodiment includes a plurality of signal fields [HEW-SIG(1), HEW-SIG(2), . . . , HEW-SIG(N)] 2011, 2012, . . . , 201N and a plurality of compressed address fields 2021, 2022, . . . , 202N corresponding to the HEW-SIG(1) 2011, HEW-SIG(2) 2012, . . . , HEW-SIG(N) 201N. That is, the address field includes a combination of each of the plurality of signal fields and a corresponding compressed address field. Each HEW-SIG(i) 201i carries signaling information for a HEW device.

In some embodiments, each HEW-SIG(i) 201i may carry signaling information dedicated to a device indicated by the compressed address of the corresponding compressed address field. In one embodiment, a signal field for carrying signaling information being common to the plurality of devices indicated by the plurality of compressed address fields 2021 to 202N may be transmitted separately.

Figure 21:
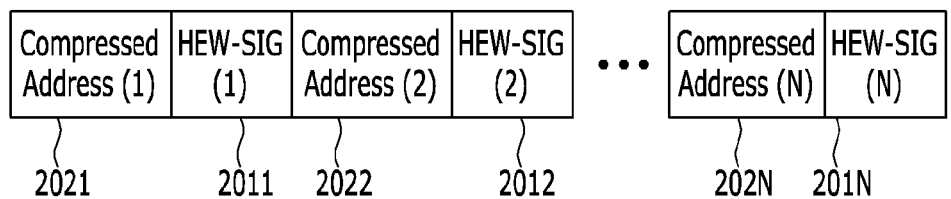

In some embodiment, as shown in FIG. 21, each compressed address field 202i may precede the corresponding HEW-SIG(i) 201i.

Next, a frame including an address field according to various embodiments described with reference to FIG. 18 to FIG. 21 is described.

Figure 26:
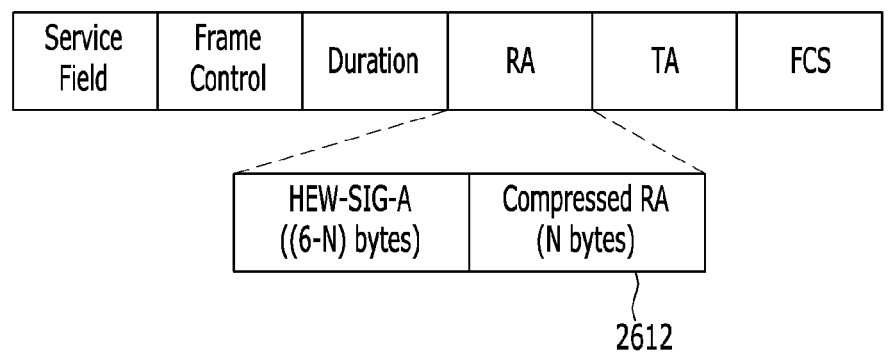
Figure 27:
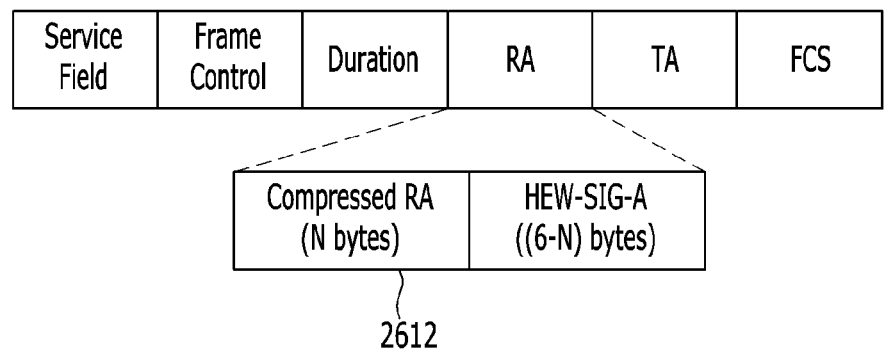
Figure 28:
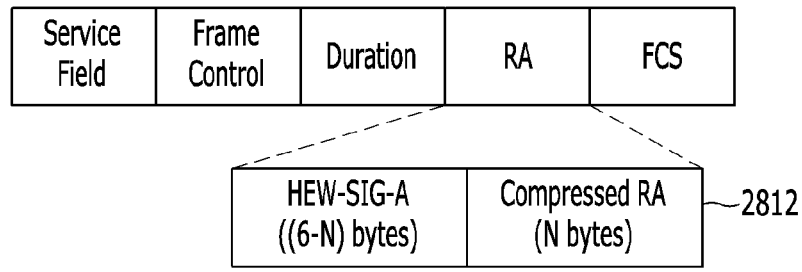
FIG. 28 and FIG. 29 exemplify a response frame using a compressed address according to various embodiments of the present invention.
Figure 29:
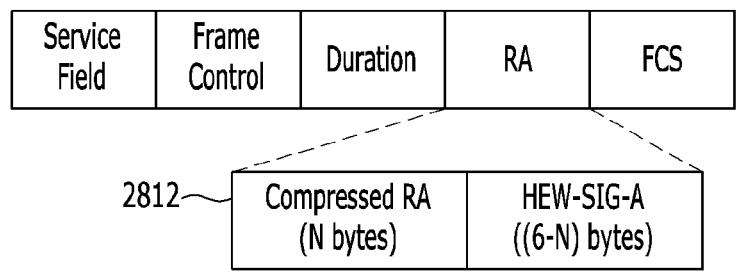

FIG. 22, FIG. 23, FIG. 24, FIG. 25, FIG. 26 and FIG. 27 exemplify a request frame using a compressed address according to various embodiments of the present invention, and FIG. 28 and FIG. 29 exemplify a response frame using a compressed address according to various embodiments of the present invention. For convenience, only a data field is shown in FIG. 22, FIG. 23, FIG. 24, FIG. 25, FIG. 26, FIG. 26, FIG. 28, and FIG. 29, and tail bits and pad bits are omitted. Further, it is assumed that the address field has 6 bytes.

Figure 22:
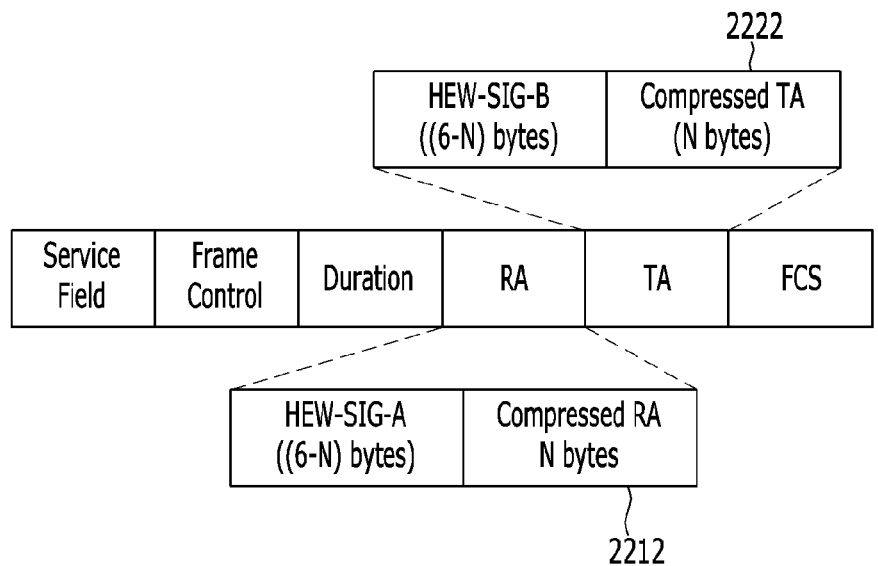
FIG. 22, FIG. 23, FIG. 24, FIG. 25, FIG. 26 and FIG. 27 exemplify a request frame using a compressed address according to various embodiments of the present invention.
Figure 23:
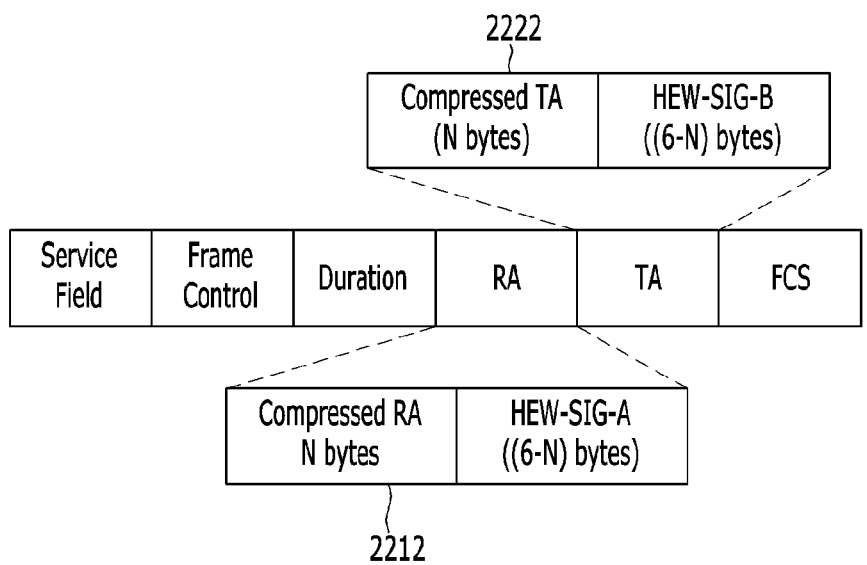

Referring to FIG. 22 and FIG. 23, both an RA field and a TA field of a request frame use a compressed address. The RA field includes a signal field (HEW-SIG-A) and a compressed address field 2212, and the compressed address field 2212 carries an address (a compressed RA) into which an RA that is an address of a device destined to receive the request frame is compressed. The TA field includes a signal field (HEW-SIG-B) and a compressed address field 2222, and the compressed address field 2222 carries an address (a compressed TA) into which a TA that is an address of a device transmitting the request frame is compressed.

As shown in FIG. 22, the compressed address fields 2212 and 2222 may respectively follow the HEW-SIG-A and HEW-SIG-B in the RA field and TA field. Alternatively, as shown in FIG. 23, the HEW-SIG-A and HEW-SIG-B may respectively follow the compressed address fields 2212 and 2222 in the RA field and TA field. Hereinafter, the request frame shown in FIG. 22 is referred to as a request frame of type 1, and the request frame shown in FIG. 23 is referred to as a request frame of type 2.

When the compressed address uses N bytes, the request frame of type 1 or 2 can carry signaling information having 2*(6−N) bytes through the HEW-SIG-A and HEW-SIG-B.

Figure 24:
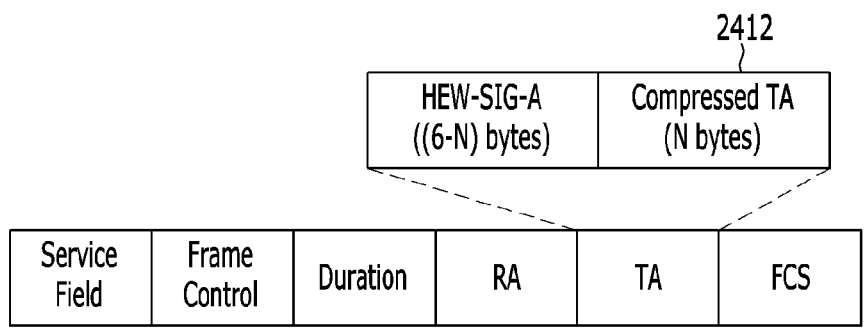
Figure 25:
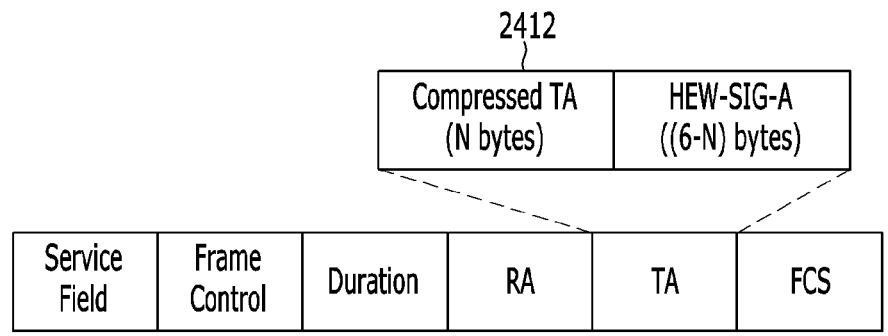

Referring to FIG. 24 and FIG. 25, a TA field of a request frame uses a compressed address. The TA field includes a signal field (HEW-SIG-A) and a compressed address field 2412, and the compressed address field 2412 carries an address (a compressed TA) into which a TA that is an address of a device transmitting the request frame is compressed.

As shown in FIG. 24, the compressed address field 2412 may follow the HEW-SIG-A in the TA field. Alternatively, as shown in FIG. 25, the HEW-SIG-A may follow the compressed address field 2412 in the TA field. Hereinafter, the request frame shown in FIG. 24 is referred to as a request frame of type 3, and the request frame shown in FIG. 25 is referred to as a request frame of type 4.

When the compressed address uses N bytes, the request frame of type 3 or 4 can carry signaling information having (6−N) bytes through the HEW-SIG-A.

Referring to FIG. 26 and FIG. 27, an RA field of a request frame uses a compressed address. The RA field includes a signal field (HEW-SIG-A) and a compressed address field 2612, and the compressed address field 2612 carries an address (a compressed RA) into which an RA that is an address of a device destined to receive the request frame is compressed.

As shown in FIG. 26, the compressed address field 2612 may follow the HEW-SIG-A in the RA field. Alternatively, as shown in FIG. 27, the HEW-SIG-A may follow the compressed address field 2612 in the RA field. Hereinafter, the request frame shown in FIG. 26 is referred to as a request frame of type 5, and the request frame shown in FIG. 27 is referred to as a request frame of type 6.

When the compressed address uses N bytes, the request frame of type 5 or 6 can carry signaling information having (6−N) bytes through the HEW-SIG-A.

A request frame shown in FIG. 16, i.e., a request frame using no compressed address may be used in an embodiment of the present invention. Hereinafter, this request frame is referred to as a request frame of type 7.

In an embodiment, any one of the request frames of types 1, 2, 3, 4, 5, 6, and 7 may be used. In another embodiment, at least two of the request frames of types 1, 2, 3, 4, 5, 6, and 7 may be used. In this case, the HEW device may select any one of the at least two types and transmit the request frame of the selected type.

Since the HEW device is capable of receiving the request frames of all types, the signaling indication can indicate the signaling transmission mode in the request frames of all types.

However, a previous WLAN device, for example a legacy device, an HT device, or a VHT device cannot identify an address from an address field using the compressed address. Accordingly, in the request frames of types 3, 4, and 7 that use an uncompressed address, i.e., a previous WLAN address in the RA field, the signaling indication may indicate a previous WLAN transmission mode, i.e., a legacy transmission mode.

Referring to FIG. 28 and FIG. 29, an RA field of a response frame uses a compressed address. The RA field includes a signal field (HEW-SIG-A) and a compressed address field 2812, and the compressed address field 2812 carries an address (a compressed RA) into which an RA that is an address of a device destined to receive the response frame is compressed.

In one embodiment, when a TA field of a request frame uses a compressed address field, a compressed address of the compressed address field of the TA field may be copied to the compressed address field 2812 of the RA field. In another embodiment, when the TA field of the request frame does not use the compressed address field, a HEW device having received the request frame may compress an address of the TA field and input the compressed address to the compressed address field 2812 of the RA field.

As shown in FIG. 28, the compressed address field 2812 may follow the HEW-SIG-A in the RA field. Alternatively, as shown in FIG. 29, the HEW-SIG-A may follow the compressed address field 2812 in the RA field. Hereinafter, the response frame shown in FIG. 28 is referred to as a response frame of type 1, and the response frame shown in FIG. 27 is referred to as a response frame of type 2.

When the compressed address uses N bytes, the response frame of type 1 or 2 can carry signaling information having (6−N) bytes through the HEW-SIG-A.

A response frame shown in FIG. 17, i.e., a response frame using no compressed address may be used in an embodiment of the present invention. Hereinafter, this response frame is referred to as a response frame of type 3.

In an embodiment, any one of the response frames of types 1, 2, and 3 may be used. In another embodiment, at least two of the request frames of types 1, 2, and 3 may be used. In this case, the HEW device may select any one of the at least two types and transmit the response frame of the selected type.

Since the HEW device is capable of receiving the response frames of all types, the signaling indication can indicate the signaling transmission mode in the response frames of all types.

In the response frame of type 3 that uses an uncompressed address, i.e., a previous WLAN address in the RA field, the signaling indication may indicate a previous WLAN transmission mode, i.e., a legacy transmission mode.

If the RA field of the request frame or response frame includes a compressed address and signaling information, the HEW device can determine whether it is a recipient of the frame based on the compressed address of the RA field. The HEW device can receive the signaling information and transmit a certain frame in response to the received frame when it is the recipient of the received frame. The HEW device can set a NAV based on a duration field of the received frame when it is not the recipient of the received frame. However, the previous WLAN device can set the NAV based on the received frame since its address is different from a value of the RA field defined by the compressed address and the signaling information.

Next, an example of a method for generating a compressed address from an address of a device is described.

In an embodiment, a compressed address may be generated by operating an address of a device using a transfer function as in Equation 1.

$$y=f(x) \qquad \text{Equation 1}$$

In Equation 1, y is the compressed address, f( ) is the transfer function, and x is the address of the device.

In one example, the transfer function f(x) may be a hash function. The hash function is an algorithm for mapping input data x to data of a fixed size, and a values y returned by the hash function is called a hash value. A hash procedure of the hash function is deterministic. That is, if two hash values are different, two original data of the two hash values are also different.

One example of the hash function f(x) may be an x %8 function. This hash function is used to compress the input data into 3 bits. Since eight hash values can be output depending on the input data, this hash function can classify eighth IDs, i.e., addresses.

Assuming that devices whose original addresses are 36, 18, 72, 43, and 6 are present, the original address can be compressed into 3 bits through the x %8 function. Address 36 is compressed into 4 (=36%8), address 18 into 2 (=18%8), address 72 into 0 (=72%8), address 43 into 3 (=43%8), and address 6 into 6 (=6%8).

Another example of the hash function f(x) may be an exclusive OR (XOR) function. The XOR function is an algorithm for performing an XOR operation of adjacent bits in n bits. For example, when two adjacent bits are output to one bit through the XOR operation, an address of 48 bits can be compressed into the compressed address of 24 bits.

As described above, because the address field uses the compressed address, the remaining bits of the address field can be used to carry signaling information. Accordingly, additional signaling information can be transmitted without increasing a length of a frame. Since the number of devices within the BSS is generally limited and $2^{8*N}$ devices can be identified even if N bytes are used in the address field of 6 bytes, the compressed address cannot have an influence on network performance.

While it has been described in the above embodiments of the present invention that a part of the address field is used for the compressed address field and a remaining part is used for the signal field, the whole of the address field can be used to carry the signaling information. These embodiments are described below.

Figure 30:
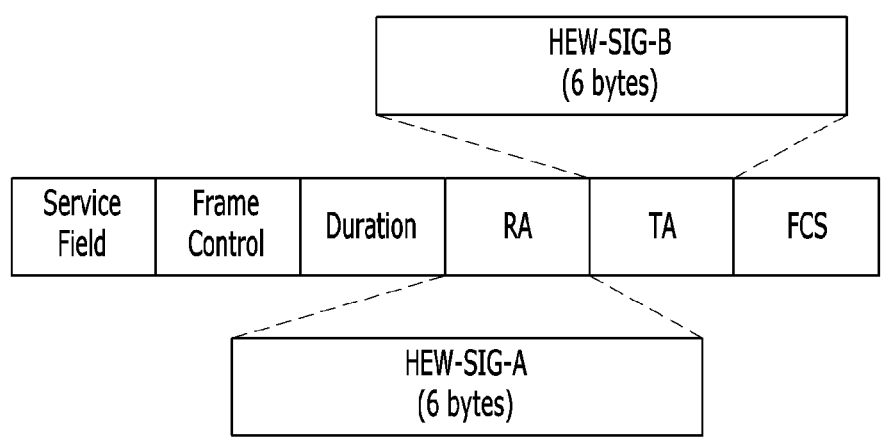
FIG. 30, FIG. 31, and FIG. 32 exemplify a request frame without a compressed address according to various embodiments of the present invention.
Figure 31:
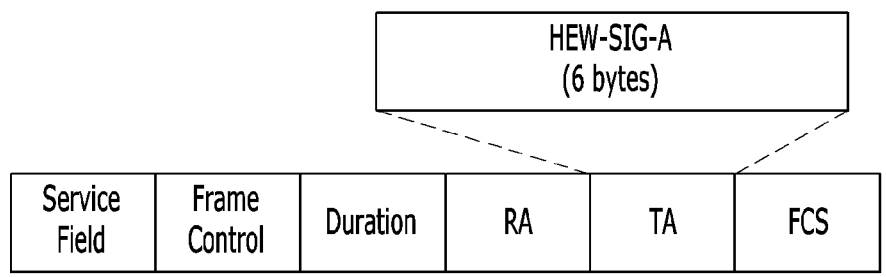
Figure 32:
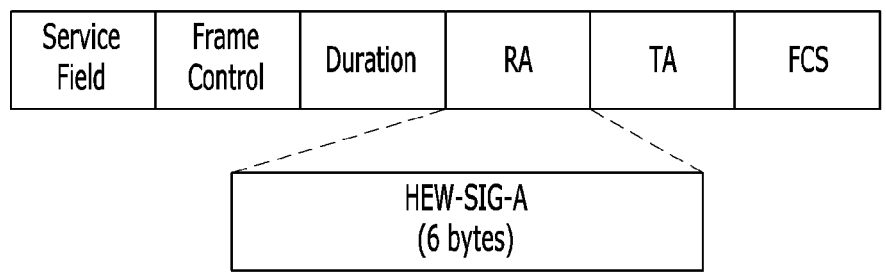
Figure 33:
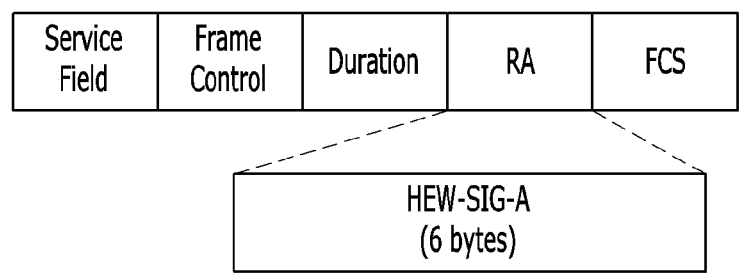
FIG. 33 exemplifies a response frame without a compressed address according to various embodiments of the present invention.
Figure 34:
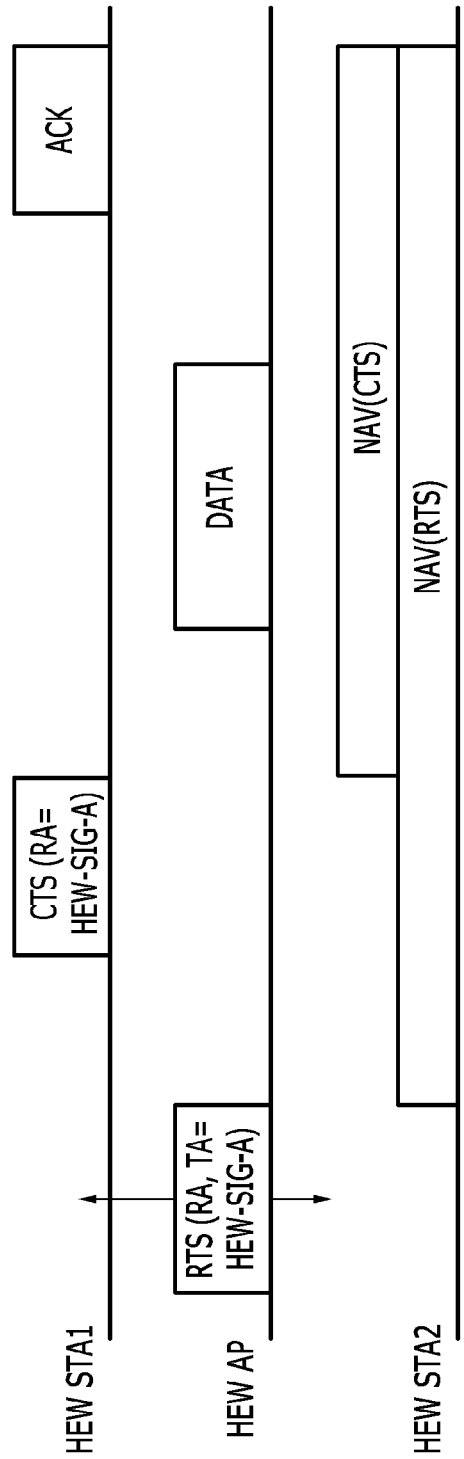
FIG. 34 shows an example of an exchange of a request frame and a response frame shown in FIG. 30 to FIG. 33.

FIG. 30, FIG. 31, and FIG. 32 exemplify a request frame without a compressed address according to various embodiments of the present invention, FIG. 33 exemplifies a response frame without a compressed address according to various embodiments of the present invention, and FIG. 34 shows an example of an exchange of a request frame and a response frame shown in FIG. 30 to FIG. 33. For convenience, only a data field is shown in FIG. 30, FIG. 31, FIG. 32, and FIG. 33.

Referring to FIG. 30, an RA field and a TA field of a request frame are used to carry signaling information. The RA field includes a signal field (HEW-SIG-A) and the TA field includes a signal field (HEW-SIG-B). The entire RA field may be the HEW-SIG-A and the entire TA field may be the HEW-SIG-B.

Hereinafter, the request frame shown in FIG. 30 is referred to as a request frame of type 1. When each of the RA field and the TA field has 6 bytes, the request frame of type 1 can carry signaling information having 12 bytes.

Referring to FIG. 31, a TA field of a request frame is used to carry signaling information. The RA field includes an RA that is an address of a device destined to receive the request frame and the TA field includes a signal field (HEW-SIG-A). The entire TA field may be the HEW-SIG-A.

Referring to FIG. 32, an RA field of a request frame is used to carry signaling information. The TA field includes a TA that is an address of a device transmitting the request frame and the RA field includes a signal field (HEW-SIG-A). The entire RA field may be the HEW-SIG-A.

Hereinafter, the request frame shown in FIG. 31 is referred to as a request frame of type 2 and the request frame shown in FIG. 32 is referred to as a request frame of type 3. When each of the RA field and the TA field has 6 bytes, the request frame of type 2 or 3 can carry signaling information having 6 bytes.

A request frame shown in FIG. 16, i.e., a request frame that does not carry the signaling information through the address field may be used in an embodiment of the present invention. Hereinafter, this request frame is referred to as a request frame of type 4.

In an embodiment, any one of the request frames of types 1, 2, 3, and 4 may be used. In another embodiment, at least two of the request frames of types 1, 2, 3, and 4 may be used. In this case, the HEW device may select any one of the at least two types and transmit the request frame of the selected type.

Referring to FIG. 33, an RA field of a response frame is used to carry signaling information. The RA field includes a signal field (HEW-SIG-A). The entire RA field may be the HEW-SIG-A. Hereinafter, the response frame shown in FIG. 33 is referred to as a response frame of type 1. When the RA field has 6 bytes, the response frame of type 1 can carry signaling information having 6 bytes.

A response frame shown in FIG. 17, i.e., a response frame that does not carry the signaling information through the address field may be used in an embodiment of the present invention. Hereinafter, this request frame is referred to as a response frame of type 2.

In some embodiments, the request frame or the response frame described with reference to FIG. 30 to FIG. 33 may be applied to a case that it is determined from frames reported by HEW devices within a BSS that an overlapping BSS (OBSS) does not exist or a case that HEW devices can operate under a HEW greenfield mode because no previous WLAN device exists within the BSS. In this case, a signal field of an address field or a signal field of a PHY frame may include BSS information.

In some embodiments, the BSS information may include a BSS color ID and/or a partial association ID (PAID). The BSS color ID is an ID used to distinguish a neighboring BSS and may have for example 3 bits. The PAID is an ID generated by a combination of some bits of an association ID (AID) and a BSSID, and may have for example 9 bits.

For example, as shown in FIG. 34, a transmitting HEW device (HEW AP) may transmit a request frame of type 2. In HEW devices (HEW STA1 and HEW STA2) having received the request frame of type 2, the HEW STA1 whose address matches the RA field of the request frame may transmit a response frame of type 1. The HEW AP can determine that the response frame is transmitted from its own BSS, i.e., is a response of the request frame transmitted by the HEW AP, based on BSS information indicated by the signal field (HEW-SIG-A) of the response frame. The BSS information may be transmitted through another signal field instead of the HEW-SIG-A included in the RA field of the response frame. Accordingly, the HEW AP can transmit a data frame to the HEW STA1 and then receive an ACK frame from the HEW STA1.

The other HEW device (HEW STA2) sets a NAV based on a value indicated by a duration field of the request frame since its address does not match the RA field of the request frame. If the HEW STA2 receives the response frame, the HEW STA2 may update the NAV based on a value indicated by a duration field of the response frame.

Alternatively, the HEW AP may transmit a request frame of type 3. HEW devices (HEW STA1 and HEW STA2) having received the request frame of type 3 can determine whether they are a recipient of the request frame from a PAID included in BSS information set to a signal field (HEW-SIG-A) of the request frame. The BSS information may be transmitted through another signal field instead of the HEW-SIG-A included in the RA field of the response frame.

Accordingly, the HEW STA1 that is the recipient of the request frame may transmit a response frame of type 1. The HEW AP can determine that the response frame is transmitted from its BSS, based on BSS information indicated by the signal field (HEW-SIG-A) of the response frame. Accordingly, the HEW AP can transmit a data frame to the HEW STA1 and then receive an ACK frame from the HEW STA1.

As described above, since the entire address field can be used to carry signaling information, additional signaling information can be transmitted without increasing a length of a frame.

Next, embodiments for indicating that a request frame or a response frame carries signaling information using an address field are described with reference to FIG. 35, FIG. 36, FIG. 37, FIG. 38, and FIG. 39.

Figure 35:
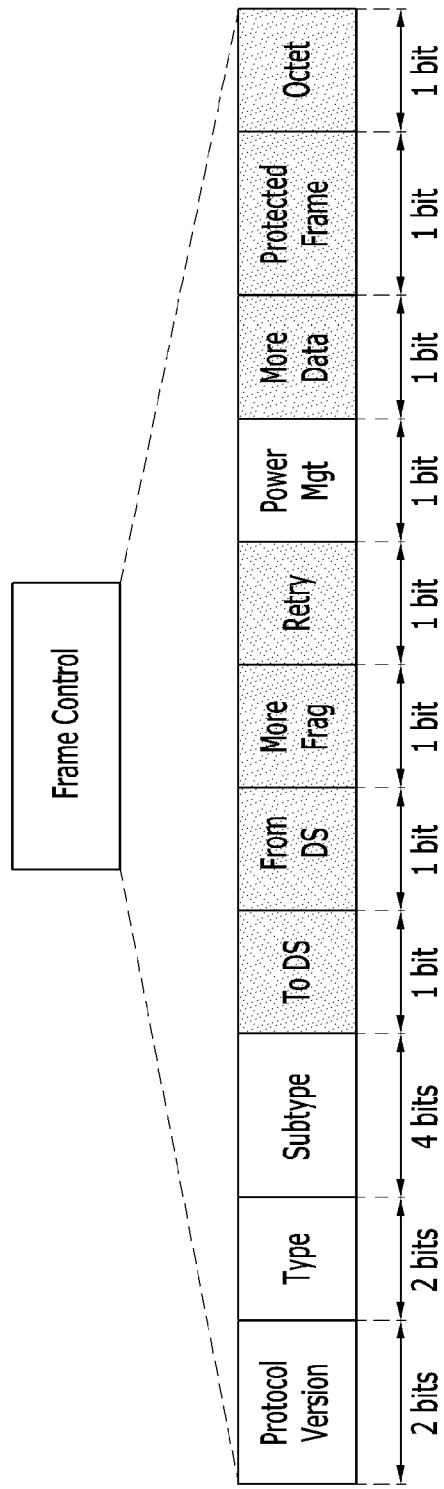
FIG. 35 exemplifies a frame control field in a WLAN according to an embodiment of the present invention.
Figure 36:
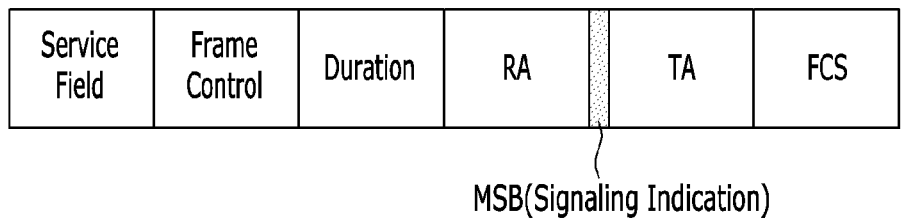
FIG. 36 and FIG. 37 exemplify a TA field of a request frame in a WLAN according to embodiments of the present invention.
Figure 37:
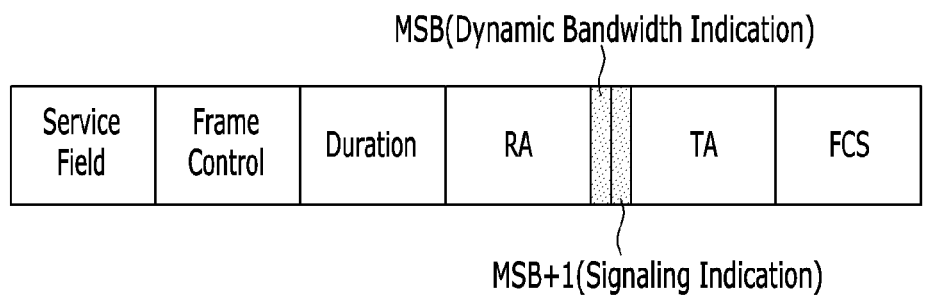
Figure 38:
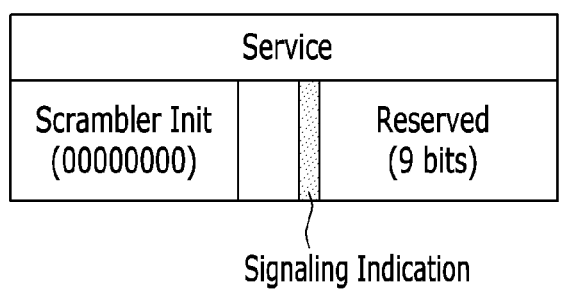
FIG. 38 exemplifies a service field in a WLAN according to an embodiment of the present invention.

FIG. 35 exemplifies a frame control field in a WLAN according to an embodiment of the present invention, FIG. 36 and FIG. 37 exemplify a TA field of a request frame in a WLAN according to embodiments of the present invention, and FIG. 38 exemplifies a service field in a WLAN according to an embodiment of the present invention.

In an embodiment, as shown in FIG. 35, a frame control field of a request or response frame includes a signaling indication for indicating a signaling transmission mode where the frame transmits signaling information using an address field.

The frame control field includes a protocol version field, a type field, a subtype field, a To DS field, a From DS field, a more fragments field, a retry field, a power management field, a more data field, a protected frame field, and an order field.

The protocol version field is 2 bits in length and includes a protocol version of a standard.

The type field and the subtype field indicate frame type and subtype as described above. The type field is 2 bits in length and the subtype field is 4 bits in length.

Each of the To DS field and the From DS field is 1 bit in length. The To DS field is set to '1' in data frames destined for a DS and the From DS field is set to '1' in data frames exiting the DS. The more fragments field is 1 bit in length and is set to '1' in data or management frames that have another fragment of a current MSDU or current MMPDU to follow. The retry field is 1 bit in length and is set to '1' in any data or management type frame that is a retransmission of an earlier frame.

The power management field is 1 bit in length and is used to indicate a power management mode of a device. A value of '1' indicates that the device will be in a power-save mode and a value of '0' that the device will be in an active mode.

The more data field is 1 bit in length and is used for an AP to indicate to a station that the AP has one or more buffered MSDUs or MMPDUs for the station. The data field is valid in individually addressed data or management frames and is set to '1' when at least one additional buffered MSDU or MMPDU is present for the STA. The protected frame is 1 bit in length and is set to '1' if a frame body field of a data or management frame contains information that has been processed by a cryptographic encapsulation algorithm. The order field is 1 bit in length and is used for data or management frames.

In one embodiment, the subtype field of the frame control field includes the signaling indication. The request frame or response frame belongs to a control frame. Referring to Table 1 again, when the frame type is the control frame, values of '0000' to '0011' are reserved so any one of the values may be used for the signaling indication.

For example, a value of '0010' may be used for the signaling indication of the request frame and a value of '0011' may be used for the signaling indication of the response frame. Accordingly, when the type field of a frame has '01' and the subtype field of the frame has '0010', the frame may be defined as a request frame for carrying signaling information through an address field. When the type field of a frame has '01' and the subtype field of the frame has '0011', the frame may be defined as a response frame for carrying signaling information through an address field.

In another embodiment, a field that is used for only the data or management frames from among various fields of the frame control field is used for the signaling indication. As described with reference to FIG. 30, since the To DS field, the From DS field, the more fragments field, the retry field, the more data field, the protected frame field, and the order field are used for only the data or management frames, these fields are set to '0' in the control frames. Accordingly, any one of these fields may be assigned to the signaling indication. For example, when the more fragments field is assigned to the signaling indication, a request frame or a response frame whose more data field is set to '1' may be defined as a frame for carrying signaling information through an address field.

In some embodiments, when two or more bits are required for the signaling indication, at least two fields from among the To DS field, the From DS field, the more fragments field, the retry field, the more data field, the protected frame field, and the order field may be used for the signaling indication.

In yet another embodiment, a part of a TA field in a request frame is used for the signaling indication.

In a previous WLAN, an MSB of the TA field has been used for an individual/group indication for indicating an individual address or a group address. Particularly, in the IEEE standard 802.11ac, the MSB of the TA field, i.e., the individual/group indication has been used for a dynamic bandwidth indication for indicating whether a dynamic bandwidth is used.

Therefore, when the dynamic bandwidth is not supported in a WLAN according to an embodiment of the present invention, the MSB of the TA field in the request frame is used for the signaling indication as shown in FIG. 36. In some embodiments, when two or more bits are required for the signaling indication, the first N bits of the MSB may be used for the signaling indication.

Alternatively, when the dynamic bandwidth is supported in a WLAN according to an embodiment of the present invention, the first MSB of the TA field may be used for the dynamic bandwidth indication and the second MSB (i.e., MSB+1) of the TA field may be used for the signaling indication as shown in FIG. 37. In some embodiments, when two or more bits are required for the signaling indication, the second to N-th MSBs may be used for the signaling indication.

In yet another embodiment, a duration field of a request or response frame is used for the signaling indication.

Referring to Table 2, bits 0 to 14 are used for a duration value and a bit 15 is not used for the duration value in the duration field of the request or response frame. Therefore, the bit 15 of the duration field may be used for the signaling indication.

In yet another embodiment, one or more bits of a service field in a data field including a request frame or a response frame are used for the signaling indication.

As shown in FIG. 38, the first 7 bits of the service field are scrambler initialization bits and remaining bits, i.e., eighth to sixteenth bits are reserved. At least one bit of the reserved bits may be used for the signaling indication.

In yet another embodiment, one or more bits of scrambler initialization bits in a service field of a data field including a request frame or a response frame are used for the signaling indication. In some embodiments, the fourth bit B3 or the fifth bit B4 of the scrambler initialization bits may be used for the signaling indication.

First, an embodiment for using the fourth bit B3 of the scrambler initialization bit as the signaling indication is described with Table 4 to Table 11.

A data field of a PHY frame is scrambled by a scrambler, for example a frame synchronization scrambler. The scrambler repeatedly generates a 127-bit sequence to output a scrambling sequence. The same scrambler is used in a transmitter and a receiver.

The 127-bit sequence is determined by a 7-bit scrambler seed used for initializing the scrambler and a seventh-degree generator polynomial of the scrambler. In this case, the first 7 bits of the 127-bit sequence, i.e., the first 7 bits of the scrambling sequence are equal to the scrambler seed. Further, the first 7 bits of the scrambling sequence, i.e., the scrambler seed is determined by TXVECTOR or RXVECTOR parameters. The TXVECTOR represents a list of parameters that a MAC sublayer provides to a local PHY entity and the RXVECTOR represents a list of parameters that a PHY provides to a local MAC entity.

When a device transmits a frame, an initial state of a scrambler is set to a pseudorandom nonzero state when TXVECTOR parameter CH_BANDWIDTH_IN_NON_HT to be described in Table 4 is not present. A scrambling sequence is determined by a pseudorandom nonzero seed. When the TXVECTOR parameter CH_BANDWIDTH_IN_NON_HT is present, the first 7 bits of a scrambling sequence is set as in Table 4.

Figure 39:
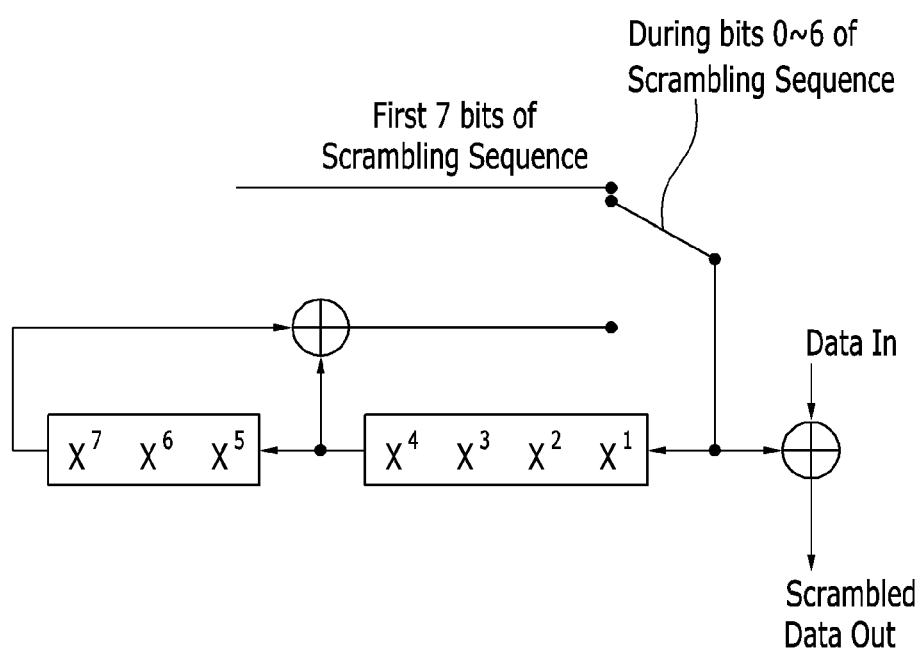
FIG. 39 exemplifies a scramble generator in a WLAN according to an embodiment of the present invention.

Remaining bits of the scrambling sequence may be generated as shown in FIG. 39. A scrambler exemplified in FIG. 39 represents a case that a generator polynomial $G(X)=X^7+X^4+1$ is used. The scrambler performs the XOR operation on register values corresponding to $X^4$ and $X^7$ to output a bit and inputs the output bit to a register. The scrambler outputs the first 7 bits of the scrambling sequence without performing the XOR operation and outputs next bits through the XOR operation after the first 7 bits are input to the register. The scrambler scrambles bits of the data field with the output bits.

Table 4 shows the first 7 bits of the scrambling sequence depending on the TXVECTOR and RXVECTOR parameters in a WLAN according to an embodiment of the present invention.

TABLE 4

| Parameter | Condition | B0-B2 | B3 | B4 | B5-B6 |
|---|---|---|---|---|---|
| | | | First 7 bits of scrambling sequence | | |
| TXVECTOR | CH_BANDWIDTH_IN_NON_HT is present and DYN_BANDWIDTH_IN_NON_HT is not present | | 5-bit pseudorandom nonzero integer if CH_BANDWIDTH_IN_NON_HT equals CBW20 and 5-bit pseudorandom integer otherwise | | CH_BANDWIDTH_IN_NON_HT |
| TXVECTOR | CH_BANDWIDTH_IN_NON_HT is present and DYN_BANDWIDTH_IN_NON_HT is present | | 4-bit pseudorandom nonzero integer if CH_BANDWIDTH_IN_NON_HT equals CBW20 and DYN_BANDWIDTH_IN_NON_HT equals Static, and a 4-bit pseudorandom integer otherwise | DYN_BANDWIDTH_IN_NON_HT | CH_BANDWIDTH_IN_NON_HT |
| RXVECTOR | CH_BANDWIDTH_IN_NON_HT is present and DYN_BANDWIDTH_IN_NON_HT is present | | | DYN_BANDWIDTH_IN_NON_HT | Mapped according to Table 6 to CH_BANDWIDTH_IN_NON_HT |
| TXVECTOR | HEW_SIG_CH_BW_IN_NON_HT and DYN_BANDWIDTH_IN_NON_HT are present and HEW_SIG_IN_NON_HT is present | 3 bit pseudo-random non-zero integer if HEW_SIG_CH_BW_IN_NON_HT equals CBW20 and HEW_SIG_IN_NON_HT equals Not support HEW signaling and 3-bit pseudo-random integer otherwise | HEW_SIG_IN_NON_HT = 0 | DYN_BANDWIDTH_IN_NON_HT | HEW_SIG_CH_BW_IN_NON_HT |
| RXVECTOR | HEW_SIG_CH_BW_IN_NON_HT and DYN_BANDWIDTH_IN_NON_HT are present and HEW_SIG_IN_NON_HT is present | | HEW_SIG_IN_NON_HT = 0 | DYN_BANDWIDTH_IN_NON_HT | Mapped according to table 4 to HEW_SIG_CH_BW_IN_NON_HT |
| TXVECTOR | HEW_SIG_CH_BW_IN_NON_HT and DYN_BANDWIDTH_IN_NON_HT are present and HEW_SIG_IN_NON_HT is present | 3 bit pseudo-random non-zero integer if HEW_SIG_CH_BW_IN_NON_HT equals CBW20 and HEW_SIG_IN_NON_HT equals Not | HEW_SIG_IN_NON_HT = 1 | | HEW_SIG_MODE_IN_NON_HT |

TABLE 4-continued

| Parameter | Condition | First 7 bits of scrambling sequence | | |
|---|---|---|---|---|
| | | B0-B2 | B3 B4 | B5-B6 |
| | | support HEW signaling and 3-bit pseudo-random integer otherwise | | |
| RXVECTOR | HEW_SIG_CH_BW_IN_NON_HT and DYN_BANDWIDTH_IN_NON_HT are present and HEW_SIG_IN_NON_HT is present | | | Mapped according to Table 6 to HEW_SIG_CH_BW_IN_NON_HT |

Table 5 shows the TXVECTOR parameter CH_BANDWIDTH_IN_NON_HT of Table 4.

TABLE 5

| Enumerated value | Meaning | Value |
|---|---|---|
| CBW20 | channel bandwidth 20 MHz | 0 |
| CBW40 | channel bandwidth 40 MHz | 1 |
| CBW80 | channel bandwidth 80 MHz | 2 |
| CBW160 or CBW80 + 80 | channel bandwidth 160 MHz or channel bandwidth 80 MHz + 80 MHz | 3 |

Table 6 shows the RXVECTOR parameter CH_BANDWIDTH_IN_NON_HT or HEW_SIG_CH_BW_IN_NON_HT of Table 4.

TABLE 6

| CbwInNonHtTemp | RXVECTOR parameter |
|---|---|
| 0 | CBW20 |
| 1 | CBW40 |
| 2 | CBW80 |
| 3 | CBW160 or CBW80 + 80 |

Table 7 shows DYN_BANDWIDTH_IN_NON_HT parameter of Table 4.

TABLE 7

| Enumerated value | Value |
|---|---|
| Static | 0 |
| Dynamic | 1 |

Table 8 shows the TXVECTOR parameter HEW_SIG_CH_BW_IN_NON_HT of Table 4.

TABLE 8

| HEW_SIG_IN_NON_HT B3 | DYN_BANDWIDTH_IN_NON_HT B4 | Enumerated value | Meaning | Value [B5:B6] |
|---|---|---|---|---|
| 0 | 1 | CBW20 | channel bandwidth 20 MHz | 0 |
| 0 | 1 | CBW40 | channel bandwidth 40 MHz | 1 |
| 0 | 1 | CBW80 | channel bandwidth 80 MHz | 2 |
| 0 | 1 | CBW160 or CBW80 + 80 | channel bandwidth 160 MHz or channel bandwidth 80 MHz + 80 MHz | 3 |

Table 9 shows the TXVECTOR parameter HEW_SIG_IN_NON_HT parameter of Table 4.

TABLE 9

| HEW_SIG_IN_NON_HT B3 | Enumerated value | Meaning | Value [B4:B6] |
|---|---|---|---|
| 1 | HEWSIG0 | HEW SIG MODE 0 | 0 |
| 1 | HEWSIG1 | HEW SIG MODE 1 | 1 |
| 1 | HEWSIG2 | HEW SIG MODE 2 | 2 |
| 1 | HEWSIG3 | HEW SIG MODE 3 | 3 |
| 1 | HEWSIG4 | HEW SIG MODE 4 | 4 |
| 1 | HEWSIG5 | HEW SIG MODE 5 | 5 |
| 1 | HEWSIG6 | HEW SIG MODE 6 | 6 |
| 1 | HEWSIG7 | HEW SIG MODE 7 | 7 |

Table 10 shows the RXVECTOR parameter HEW_SIG_MODE_IN_NON_HT parameter of Table 4.

TABLE 10

| HewSigModeInNonHtTemp | RXVECTOR parameter |
|---|---|
| 0 | HEWSIG0 |
| 1 | HEWSIG1 |
| 2 | HEWSIG2 |
| 3 | HEWSIG3 |
| 4 | HEWSIG4 |
| 5 | HEWSIG5 |
| 6 | HEWSIG6 |
| 7 | HEWSIG7 |

Table 11 shows the HEW_SIG_IN_NON_HT parameter of Table 4.

TABLE 11

| Enumerated value | Value |
|---|---|
| Not support HEW signaling | 0 |
| Support HEW signaling | 1 |

Referring to Table 4, the CH_BANDWIDTH_IN_NON_HT, DYN_BANDWIDTH_IN_NON_HT, HEW_SIG_CH_BW_IN_NON_HT, HEW_SIG_IN_NON_HT, and HEW_SIG_MODE_IN_NON_HT parameters are provided as the TXVECTOR and RXVECTOR parameters.

In Table 4, the CH_BANDWIDTH_IN_NON_HT parameter is a parameter defined in the IEEE standard 802.11ac and is defined as in Table 5 and Table 6. The DYN_BANDWIDTH_IN_NON_HT parameter is a parameter defined in the IEEE standard 802.11ac and is defined as in Table 7.

Referring to Table 5, the TXVECTOR parameter CH_BANDWIDTH_IN_NON_HT is represented as any one of CBW20, CBW40, CBW80, and CBW160 or CBW80+80. CBW20 has a value of 0 and indicates that a channel bandwidth 20 MHz is used. CBW40 has a value of 1 and indicates that a channel bandwidth 40 MHz is used. CBW80 has a value of 2 and indicates that a channel bandwidth 80 MHz is used. CBW160 or CBW80+80 has a value of 3 and indicates that a channel bandwidth 160 MHz or 80 MHz+80 MHz is used.

Referring to Table 6, CbwInNonHtTemp variable is mapped to any one of CBW20, CBW40, CBW80, CBW160, and CBW80+80 of the RXVECTOR parameter CH_BANDWIDTH_IN_NON_HT or HEW_SIG_CH_BW_IN_NON_HT.

Referring to Table 7, the DYN_BANDWIDTH_IN_NON_HT parameter is represented any one of "Static" and "Dynamic."

"Static" has a value of 0 and indicates that a dynamic bandwidth allocation is not used.

"Dynamic" has a value of 1 and indicates that the dynamic bandwidth allocation is used.

In Table 4, the HEW_SIG_CH_BW_IN_NON_HT, HEW_SIG_IN_NON_HT and HEW_SIG_MODE_IN_NON_HT parameters are parameters defined in a WLAN according to an embodiment of the present invention. The HEW_SIG_CH_BW_IN_NON_HT parameter is defined as in Table 8 and Table 6, the HEW_SIG_IN_NON_HT parameter is defined as in Table 10 and Table 11, and the HEW_SIG_MODE_IN_NON_HT parameter is defined as in Table 12. In some embodiments, the HEW_SIG_CH_BW_IN_NON_HT parameter may be replaced with the CH_BANDWIDTH_IN_NON_HT parameter.

Referring to Table 8, the TXVECTOR parameter HEW_SIG_CH_BW_IN_NON_HT is used when the HEW_SIG_IN_NON_HT parameter is and the DYN_BANDWIDTH_IN_NON_HT parameter is 1. The HEW_SIG_CH_BW_IN_NON_HT parameter is represented as any one of CBW20, CBW40, CBW80, and CBW160 or CBW80+80. CBW20 has a value of 0 and indicates that a channel bandwidth 20 MHz is used. CBW40 has a value of 1 and indicates that a channel bandwidth 40 MHz is used. CBW80 has a value of 2 and indicates that a channel bandwidth 80 MHz is used. CBW160 or CBW80+80 has a value of 3 and indicates that a channel bandwidth 160 MHz or 80 MHz+80 MHz is used.

Referring to Table 9, the TXVECTOR parameter HEW_SIG_IN_NON_HT is represented as any one of HEWSIG0, HEWSIG1, HEWSIG2, HEWSIG3, HEWSIG4, HEWSIG5, HEWSIG6, and HEWSIG7. HEWSIG0, HEWSIG1, HEWSIG2, HEWSIG3, HEWSIG4, HEWSIG5, HEWSIG6 and HEWSIG7 have values of 0, 1, 2, 3, 4, 5, 6, and 7, respectively, and indicate that a plurality of signaling mode, i.e., HEW SIG MODE 0, HEW SIG MODE 1, HEW SIG MODE 2, HEW SIG MODE 3, HEW SIG MODE 4, HEW SIG MODE 5, HEW SIG MODE 6, and HEW SIG MODE 7 being used, respectively. Each signaling mode may indicate any one of request frames or response frames of various types described with reference to FIG. 17 to FIG. 28. Each signaling mode may indicate any one of the request frames or response frames of various types or whether the dynamic bandwidth allocation is used. Each signaling mode may indicate any one of various modes including a signaling transmission mode and a dynamic bandwidth allocation mode.

Referring to Table 10, the HewSigModeInNonHtTemp value is mapped to any one of HEWSIG0, HEWSIG1, HEWSIG2, HEWSIG3, HEWSIG4, HEWSIG5, HEWSIG6, and HEWSIG7 in the RXVECTOR parameter HEW_SIG_MODE_IN_NON_HT.

Referring to Table 11, the HEW_SIG_IN_NON_HT parameter is a signaling indication and is represented as any one of "Not support HEW signaling" and "Support HEW signaling.". "Not support HEW signaling" has a value of 0 and indicates that a transmission of signaling information through an address field is not supported. "Support HEW signaling" has a value of 1 and indicates that the transmission of signaling information through an address field is supported. In another embodiment, "Not support HEW signaling" and "Support HEW signaling" may have values of 1 and 0, respectively.

Referring to Table 4 again, the first to third rows of Table 4 correspond to part for supporting backward compatibility on VHT devices in a WLAN according to an embodiment of the present invention.

If the CH_BANDWIDTH_IN_NON_HT parameter is present and the DYN_BANDWIDTH_IN_NON_HT parameter is not present in the TXVECTOR parameter, a transmitting VHT device sets the first 7 bits of a scrambling sequence as in the first row of Table 4. The last two bits B5 and B6 of the 7 bits are set according to the CH_BANDWIDTH_IN_NON_HT parameter. The CH_BANDWIDTH_IN_NON_HT parameter may be transmitted LSB first. For example, if CBW80 has a value of 2, which is '10' in binary representation, the 2 bits B5 and B6 may be set to '0' and '1', respectively. The remaining 5 bits B0-B4 are set to a 5-bit pseudorandom nonzero integer if the CH_BANDWIDTH_IN_NON_HT parameter equals CBW20 and a 5-bit pseudorandom integer otherwise.

If the CH_BANDWIDTH_IN_NON_HT and DYN_BANDWIDTH_IN_NON_HT parameters are present in the TXVECTOR parameter, the first 7 bits are set as in the second row of Table 4. The last 2 bits B5 and B6 of the 7 bits are set according to the CH_BANDWIDTH_IN_NON_HT parameter, and the fifth bit B4 of the 7 bits is set according to the DYN_BANDWIDTH_IN_NON_HT parameter. Remaining 4 bits B0-B3 are set to a 4-bit pseudorandom nonzero integer if the CH_BANDWIDTH_IN_NON_HT parameter equals CBW20 and the DYN_BANDWIDTH_IN_NON_HT parameter equals "Static" and a 4-bit pseudorandom integer otherwise.

A receiving VHT device sets the CbwINNonHtTemp variable to bits B5 and B6 selected in the scrambling sequence, and maps the CbwINNonHtTemp variable to CH_BANDWIDTH_IN_NON_HT parameter as shown in Table 6. The receiving VHT device sets the DYN_BANDWIDTH_IN_NON_HT parameter to the bit B4 selected in the scrambling sequence. A PHY in the receiving VHT device cannot determine whether the CH_BANDWIDTH_IN_NON_HT and DYN_BANDWIDTH_IN_NON_HT parameters are present in the TXVECTOR of a transmitting PHY. Therefore, the PHY in the receiving VHT device always includes the CH_BANDWIDTH_IN_NON_HT and DYN_BANDWIDTH_IN_NON_HT parameters in the RXVECTOR.

The fourth to seventh rows of Table 4 correspond to devices in a WLAN according to an embodiment of the present invention, i.e., HEW devices.

A HEW device selects a mode using the fourth and fifth bits B3 and B4 of a scrambling sequence. The HEW device includes the HEW_SIG_CH_BW_IN_NON_HT, DYN_BANDWIDTH_IN_NON_HT, and HEW_SIG_IN_NON_HT parameters in the TXVECTOR and RXVECTOR.

In the first 7 bits of the scrambling sequence, the fourth bit B3 indicates the HEW_SIG_IN_NON_HT parameter corresponding to a signaling indication and the fifth bit B4 indicates the DYN_BANDWIDTH_IN_NON_HT parameter.

The fourth bit B3 having a value of '0' indicates that a transmission of signaling information through an address field is not supported. In this case, in the first 7 bits of the scrambling sequence, the fifth bit B4 of is used for the DYN_BANDWIDTH_IN_NON_HT parameter for indicating the dynamic bandwidth allocation and the sixth and seventh bits B5 and B6 are used for the HEW_SIG_CH_BW_IN_NON_HT parameter for indicating the channel bandwidth. Accordingly, the transmitting HEW device may indicate the dynamic bandwidth allocation by setting the bit B3 to '0' when a receiving device is a VHT device.

The fourth bit B3 having a value of '1' indicates that a transmission of signaling information through an address field is supported. In this case, the last 3 bits B4, B5, and B6 in the first 7 bits of the scrambling sequence are used for indicating the signaling mode. Accordingly, the transmitting HEW device may use the last 3 bits B4, B5, and B6 to indicate the signaling mode when a receiving device is a HEW device. Since 3 bits B4, B5, and B6 are used, eight signaling modes can maximally be indicated.

A PHY in the receiving HEW device cannot determine whether the HEW_SIG_IN_NON_HT parameter is present in the TXVECTOR of a transmitting PHY. Therefore, the receiving PHY in the HEW device always includes the HEW_SIG_IN_NON_HT parameter in the RXVECTOR. 수신 Further, the receiving PHY always includes the HEW_SIG_CH_BW_IN_NON_HT and DYN_BANDWIDTH_IN_NON_HT parameters in the RXVECTOR.

A case that the HEW_SIG_IN_NON_HT parameter is set to 0 is described.

The transmitting HEW device sets the first 7 bits of the scrambling sequence as in the fourth row of Table 4. The last 2 bits B5 and B6 are set according to the HEW_SIG_CH_BW_IN_NON_HT parameter. The HEW_SIG_CH_BW_IN_NON_HT parameter may be transmitted LSB first. For example, if CBW80 has a value of 2, which is '10' in binary representation, the 2 bits B5 and B6 may be set to '0' and '1', respectively. The fifth bit B4 of the 7 bits is set according to the DYN_BANDWIDTH_IN_NON_HT parameter. Remaining 3 bits B0-B2 are set to a 3-bit pseudorandom nonzero integer if the HEW_SIG_CH_BW_IN_NON_HT parameter equals CBW20 and the HEW_SIG_IN_NON_HT parameter equals "Not support HEW signaling" and a 3-bit pseudorandom integer otherwise.

The receiving HEW device sets the CbwINNonHtTemp variable to bits B5 and B6 selected in the scrambling sequence, and maps the CbwINNonHtTemp variable to the RXVECTOR parameter HEW_SIG_CH_BW_IN_NON_HT as shown in Table 6. The receiving HEW device sets the DYN_BANDWIDTH_IN_NON_HT parameter to the bit B4 selected in scrambling sequence. A receiving PHY in the HEW device cannot determine whether the HEW_SIG_IN_NON_HT, HEW_SIG_CH_BW_IN_NON_HT, and DYN_BANDWIDTH_IN_NON_HT parameters are present in the TXVECTOR of a transmitting PHY. Therefore, the receiving PHY always includes the HEW_SIG_IN_NON_HT, HEW_SIG_CH_BW_IN_NON_HT, and DYN_BANDWIDTH_IN_NON_HT parameters to the RXVECTOR.

A case that the HEW_SIG_IN_NON_HT parameter is set to 1 is described.

The transmitting HEW device sets the first 7 bits of the scrambling sequence as in the sixth row of Table 4. The last 3 bits B4, B5, and B6 of the 7 bits are set according to HEW_SIG_MODE_IN_NON_HT parameter. The HEW_SIG_MODE_IN_NON_HT parameter may be transmitted LSB first. For example, if HEWSIG3 has a value of 3, which is '011' in binary representation, the 3 bits B4, B5, and B6 may be set to '1', '1', and '0', respectively. Remaining 3 bits B0-B2 are set to a 3-bit pseudorandom nonzero integer if the HEW_SIG_CH_BW_IN_NON_HT parameter equals CBW20 and the HEW_SIG_IN_NON_HT parameter equals "Not support HEW signaling" and a 3-bit pseudorandom integer otherwise.

The receiving HEW device sets the HewSigModeINNonHtTemp variable to the bits B4, B5, and B6 selected in the scrambling sequence, and maps the HewSigModeINNonHtTemp variable to the RXVECTOR parameter HEW_SIG_MODE_IN_NON_HT as shown in Table 10. A receiving PHY in the HEW device cannot determine whether the HEW_SIG_IN_NON_HT, HEW_SIG_CH_BW_IN_NON_HT, and DYN_BANDWIDTH_IN_NON_HT parameters are present in the TXVECTOR of a transmitting PHY. Therefore, the receiving PHY always includes the HEW_SIG_IN_NON_HT, HEW_SIG_CH_BW_IN_NON_HT, and DYN_BANDWIDTH_IN_NON_HT parameters to the RXVECTOR.

As described above, because one bit B3 of the first 7 bits in the scrambling sequence is used for the signaling indication, it can be indicated whether signaling information is transmitted through an address field of a request frame or a response frame or whether a dynamic bandwidth allocation is used.

Next, an embodiment using the fifth bit B4 of scrambler initialization bit for the signaling indication is described with reference to Table 12, Table 13, and Table 14.

Table 12 shows the first 7 bits of the scrambling sequence depending on the TXVECTOR and RXVECTOR parameters in a WLAN according to an embodiment of the present invention.

TABLE 12

| Parameter | Condition | First 7 bits of scrambling sequence | | |
|---|---|---|---|---|
| | | B0-B2 | B3 | B4 | B5-B6 |
| TXVECTOR | CH_BANDWIDTH_IN_NON_HT is present and DYN_BANDWIDTH_IN_NON_HT is not present | 5-bit pseudorandom nonzero integer if CH_BANDWIDTH_IN_NON_HT equals CBW20 and 5-bit pseudorandom integer otherwise | | | CH_BANDWIDTH_IN_NON_HT |
| TXVECTOR | CH_BANDWIDTH_IN_NON_HT is present and DYN_BANDWIDTH_IN_NON_HT is present | 4-bit pseudorandom nonzero integer if CH_BANDWIDTH_IN_NON_HT equals CBW20 and DYN_BANDWIDTH_IN_NON_HT equals Static, and 4-bit pseudorandom integer otherwise | | DYN_BANDWIDTH_IN_NON_HT | |
| RXVECTOR | CH_BANDWIDTH_IN_NON_HT is present and DYN_BANDWIDTH_IN_NON_HT is present | — | | DYN_BANDWIDTH_IN_NON_HT | Mapped according to Table 6 to CH_BANDWIDTH_IN_NON_HT |
| TXVECTOR | HEW_SIG_CH_BW_IN_NON_HT is present and HEW_SIG_DYN_BW_NON_HT is present | 4-bit pseudorandom nonzero integer if CH_BANDWIDTH_IN_NON_HT equals CBW20 or HEWSIG0 and HEW_SIG_DYN_BW_IN_NON_HT equals HEW signaling and 4-bit pseudorandom integer otherwise | | HEW_SIG_DYN_BW_IN_NON_HT | HEW_SIG_CH_BW_IN_NON_HT |
| RXVECTOR | HEW_SIG_CH_BW_IN_NON_HT is present and HEW_SIG_DYN_BW_NON_HT is present | — | | HEW_SIG_DYN_BW_IN_NON_HT | Mapped according to Table 13 to HEW_SIG_CH_BW_IN_NON_HT |

Table 13 shows the TXVECTOR or RXVECTOR parameter HEW_SIG_CH_BW_IN_NON_HT of Table 12.

TABLE 13

| HEW_SIG_IN_NON_HT B3 | Enumerated value | Meaning | Value [B5:B6] |
|---|---|---|---|
| 1 | CBW20 | channel bandwidth 20 MHz | 0 |
| 1 | CBW40 | channel bandwidth 40 MHz | 1 |
| 1 | CBW80 | channel bandwidth 80 MHz | 2 |
| 1 | CBW160 or CBW80 + 80 | channel bandwidth 160 MHz or channel bandwidth 80 MHz + 80 MHz | 3 |
| 0 | HEWSIG0 | HEW SIG MODE 0 | 0 |
| 0 | HEWSIG1 | HEW SIG MODE 1 | 1 |
| 0 | HEWSIG2 | HEW SIG MODE 2 | 2 |
| 0 | HEWSIG3 | HEW SIG MODE 3 | 3 |

Table 14 shows the HEW_SIG_DYN_BW_IN_NON_HT parameter of Table 12

TABLE 14

| Enumerated value | Value |
|---|---|
| HEW signaling | 0 |
| Dynamic bandwidth | 1 |

Referring to Table 12, the CH_BANDWIDTH_IN_NON_HT, DYN_BANDWIDTH_IN_NON_HT, HEW_SIG_CH_BW_IN_NON_HT, and HEW_SIG_DYN_BW_IN_NON_HT parameters are provided as the TXVECTOR and RXVECTOR parameters.

In Table 12, the CH_BANDWIDTH_IN_NON_HT parameter is defined as in Table 5 and Table 6 and the DYN_BANDWIDTH_IN_NON_HT parameter is defined as in Table 7.

In Table 4, the HEW_SIG_CH_BW_IN_NON_HT and HEW_SIG_DYN_BW_IN_NON_HT parameters are parameters defined in a WLAN according to an embodiment of the present invention. The HEW_SIG_CH_BW_IN_NON_HT parameter is defined as in Table 13 and the HEW_SIG_DYN_BW_IN_NON_HT parameter is defined as in Table 14.

Referring to Table 13, usage of the TXVECTOR or RXVECTOR parameter HEW_SIG_CH_BW_IN_NON_HT is changed depending on the HEW_SIG_IN_NON_HT parameter. The HEW_SIG_IN_NON_HT parameter indicates whether the HEW_SIG_CH_BW_IN_NON_HT parameter is used for a signaling indication or a dynamic bandwidth indication. Referring to Table 14, the HEW_SIG_IN_NON_HT parameter is represented as any one of "HEW signaling" and "Dynamic bandwidth."

"HEW signaling" has a value of 0 and indicates that the HEW_SIG_CH_BW_IN_NON_HT parameter is used for the signaling indication. "Dynamic bandwidth" has a value of 1 and indicates that the HEW_SIG_CH_BW_IN_NON_HT parameter is used for the dynamic bandwidth indication. In another embodiment, "HEW signaling" and "Dynamic bandwidth" may have values of 0 and 1, respectively.

Referring to Table 13 again, if the HEW_SIG_IN_NON_HT parameter is 1, the HEW_SIG_CH_BW_IN_NON_HT parameter is represented as any one of CBW20, CBW40, CBW80, and CBW160 or CBW80+80. CBW20 has a value of 0 and indicates that a channel bandwidth 20 MHz is used. CBW40 has a value of 1 and indicates that a channel bandwidth 40 MHz is used. CBW80 has a value of 2 and indicates that a channel bandwidth 80 MHz is used. CBW160 or CBW80+80 has a value of 3 and indicates that a channel bandwidth 160 MHz or 80 MHz+80 MHz is used.

If the HEW_SIG_IN_NON_HT parameter is 0, the HEW_SIG_CH_BW_IN_NON_HT parameter is represented as any one of HEWSIG0, HEWSIG1, HEWSIG2, and HEWSIG3. HEWSIG0, HEWSIG1, HEWSIG2, and HEWSIG3 have values of 0, 1, 2, and 3, respectively, and indicate that a plurality of signaling mode, i.e., HEW_SIG MODE 0, HEW_SIG MODE 1, HEW_SIG MODE 2, and HEW_SIG MODE 3 being used, respectively. Each signaling mode may indicate any one of request frames or response frames of various types described with reference to FIG. 17 to FIG. 28.

Referring to Table 12 again, the first to third rows of Table 12 correspond to part for supporting backward compatibility on VHT devices in a WLAN according to an embodiment of the present invention, and are the same as the first to third rows of Table 4.

The fourth and fifth rows of Table 12 correspond to devices in a WLAN according to an embodiment of the present invention, i.e., HEW devices.

A HEW device selects a mode using the fifth bit B4 of a scrambling sequence. The HEW device includes the HEW_SIG_CH_BW_IN_NON_HT and HEW_SIG_DN_BW_IN_NON_HT parameters in the TXVECTOR and RXVECTOR. The fifth bit B4 of the first 7 bits in the scrambling sequence indicates the HEW_SIG_DN_BW_IN_NON_HT parameter.

The fifth bit B4 having a value of '0' indicates that a transmission of signaling information through an address field is supported. In this case, the last 2 bits B5 and B6 of the first 7 bits in the scrambling sequence are used for indicating the signaling mode. Accordingly, a transmitting HEW device sets the 2 bits B5 and B6 according to the HEW_SIG_CH_BW_IN_NON_HT parameter. The HEW_SIG_CH_BW_IN_NON_HT parameter may be transmitted LSB first. For example, if HEWSIG2 has a value of 2, which is '10' in binary representation, the 2 bits B5 and B6 may be set to '0' and '1', respectively. Remaining 4 bits B0-B3 are set to a 4-bit pseudorandom nonzero integer if the HEW_SIG_CH_BW_IN_NON_HT parameter equals CBW20 or HEWSIG0 and the HEW_SIG_DYN_BW_IN_NON_HT parameter equals "HEW signaling" and a 4-bit pseudorandom integer otherwise.

The fifth bit B4 having a value of '1' indicates that a dynamic bandwidth allocation is used. The last 2 bits B5 and B6 of the 7 bits in the scrambling sequence are used for indicating a channel bandwidth. Accordingly, a transmitting HEW device sets the 2 bits B5 and B6 according to the HEW_SIG_CH_BW_IN_NON_HT parameter. The HEW_SIG_CH_BW_IN_NON_HT parameter may be transmitted LSB first. For example, if CBW80 has a value of 2, which is '10' in binary representation, the 2 bits B5 and B6 may be set to '0' and '1', respectively. The remaining 4 bits B0-B3 are set to a 4-bit pseudorandom nonzero integer if the HEW_SIG_CH_BW_IN_NON_HT parameter equals CBW20 or HEWSIG0 and the HEW_SIG_DYN_BW_IN_NON_HT parameter equals "HEW signaling" and a 4-bit pseudorandom integer otherwise.

A receiving HEW device sets the HEW_SIG_DYN_BW_IN_NON_HT parameter to the bit B4 selected in the scrambling sequence. Further, the receiving HEW device maps a variable that is set by the bits B5 and B6 selected in scrambling sequence according to the bit B4 to the HEW_SIG_CH_BW_IN_NON_HT parameter.

As described above, because one bit B4 of the first 7 bits in the scrambling sequence is used for the signaling indication, it can be indicated whether signaling information is transmitted through an address field of a request or response frame or whether a dynamic bandwidth allocation is used.

In some embodiments, signaling information carried by an address field may include at least part of frame type information, identifier related information, multi user (MU) related information, transmission mode information of OFDM or OFDMA, resource allocation information, power saving information, calibration information, dynamic clear channel assessment (CCA) information, and interference information. The identifier related information may include a BSSID, a PAID, and/or a group ID. The calibration information may include information for calibrating a power, timing and/or a frequency. The signaling information may further include information associated with transmission or reception between a transmitting device and receiving device.

Next, examples using signaling information provided by a signaling method according to an embodiment of the present invention are described.

FIG. 40, FIG. 41, FIG. 42, FIG. 43, FIG. 44, and FIG. 45 show examples for transmitting a BSS color ID as signaling information in a WLAN according to an embodiment of the present invention. It is assumed in FIG. 40, FIG. 41, FIG. 42, FIG. 43, FIG. 44, and FIG. 45 that devices (AP1, AP2, and AP3) are access points and devices (STA1, STA2, and STA3) are stations.

Referring to FIG. 40, FIG. 41, FIG. 42, and FIG. 43, a BSS formed by the AP3 is a neighbor BSS, for example an overlapping BSS (OBSS), of a BSS (BSS1) formed by the AP1 and a BSS (BSS2) formed by the AP2.

Figure 40:
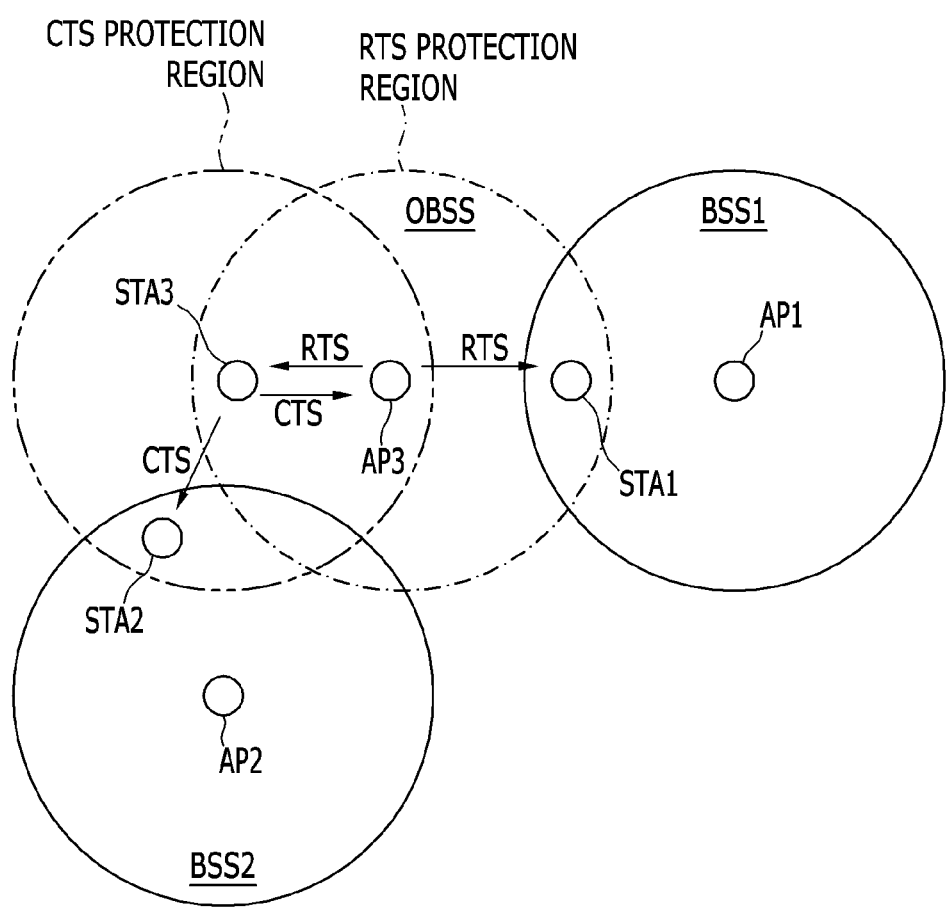
FIG. 40, FIG. 41, FIG. 42, FIG. 43, FIG. 44, and FIG. 45 show examples transmitting a BSS color ID as signaling information in a WLAN according to an embodiment of the present invention.
Figure 41:
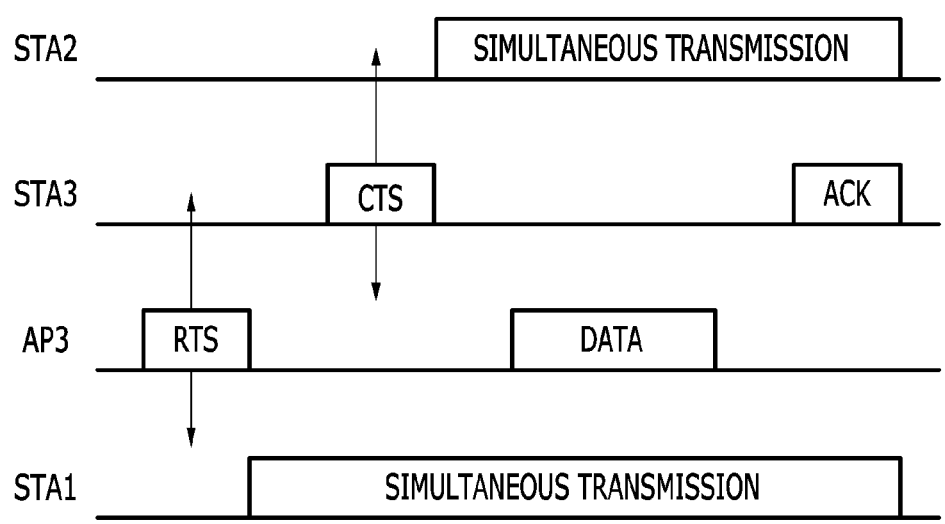

Referring to FIG. 40 and FIG. 41, when an RTS frame and a CTS frame are exchanged between a transmitting device (AP3) and a receiving device (STA3) in order for the AP3 to transmit downlink data to the STA3 in the OBSS, the RTS frame and the CTS frame each includes a BSS color ID as signaling information. An address field carrying the signaling information in the RTS frame and the CTS frame may include the BSS color ID indicating the OBSS.

In this case, the STA1 belonging to the BSS1 may be included within an RTS protection region of the RTS frame transmitted by the AP3 of the OBSS, and the STA2 belonging to the BSS2 may be included within a CTS protection region of the CTS frame transmitted by the STA3 of the OBSS. The STA1, based on the BSS color ID of the RTS frame, determines that the RTS frame is not transmitted from its BSS and does not set a NAV according to the RTS frame. Accordingly, the STA1 can communicate with the AP1 of its BSS (BSS1) regardless of the RTS frame transmitted from the OBSS. The STA2, based on the BSS color ID of the CTS frame, determines that the CTS frame is not transmitted from its BSS and does not set a NAV according to the CTS frame. Accordingly, the STA2 can communicate with the AP2 of its BSS (BSS2) regardless of the CTS frame transmitted from the OBSS.

Figure 42:
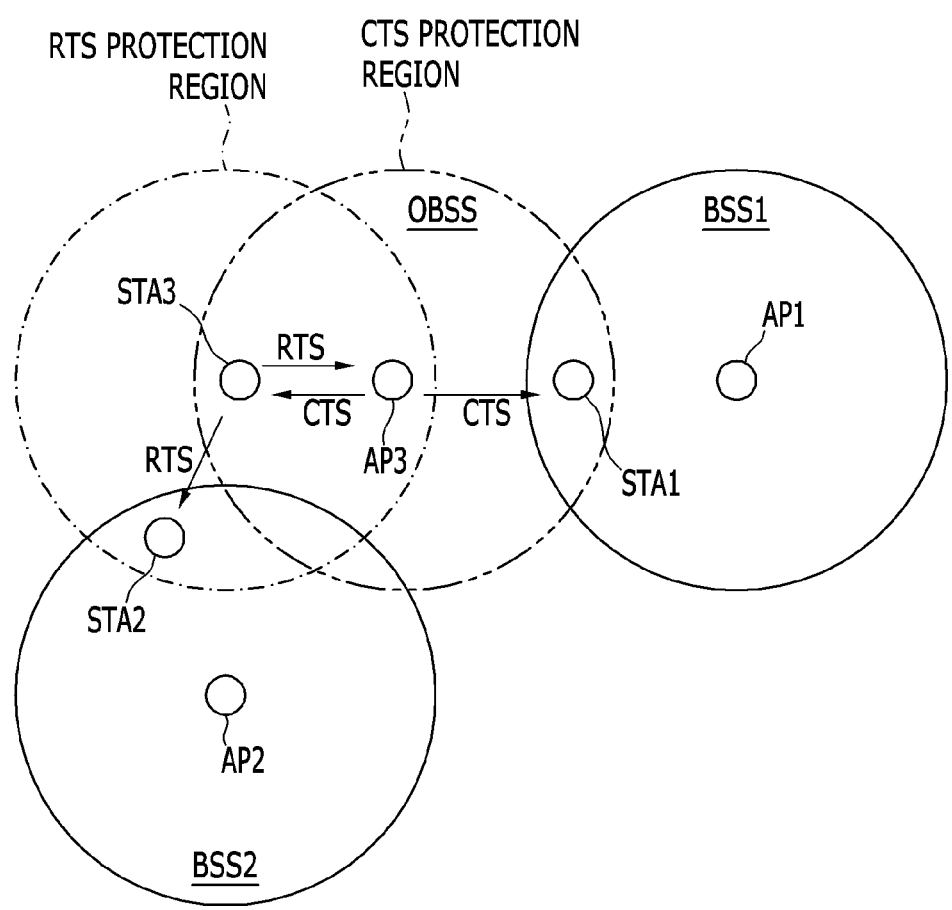
Figure 43:
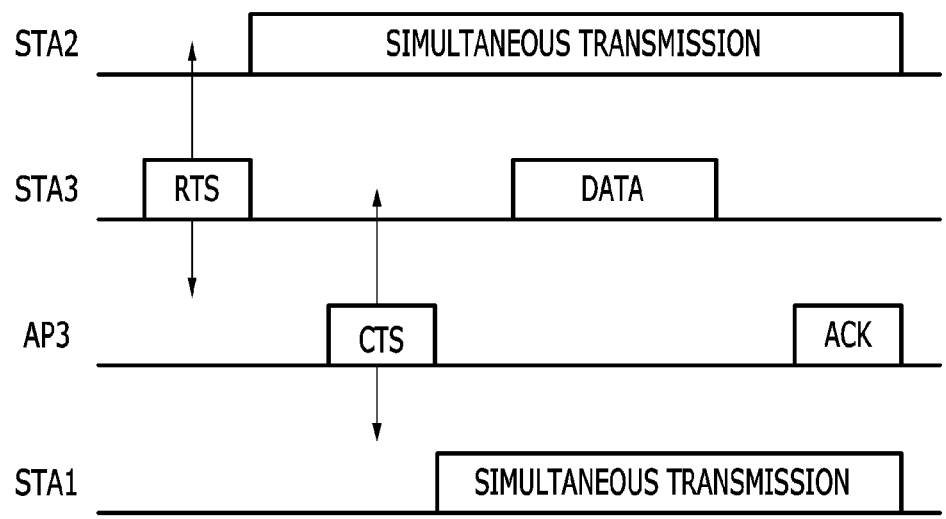

Referring to FIG. 42 and FIG. 43, when an RTS frame and a CTS frame are exchanged between a transmitting device (STA3) and a receiving device (AP3) in order for the STA3 to transmit uplink data to the AP3 in the OBSS, the RTS frame and the CTS frame each includes a BSS color ID as signaling information.

In this case, the STA1 belonging to the BSS1 may be included within a CTS protection region of the CTS frame transmitted by the AP3 of the OBSS, and the STA2 belonging to the BSS2 may be included within a CTS protection region of the CTS frame transmitted by the STA3 of the OBSS. The STA1, based on the BSS color ID of the CTS frame, determines that the CTS frame is not transmitted from its BSS and does not set a NAV according to the CTS frame. The STA2, based on the BSS color ID of the RTS frame, determines that the RTS frame is not transmitted from its BSS and does not set a NAV according to the RTS frame.

Figure 44:
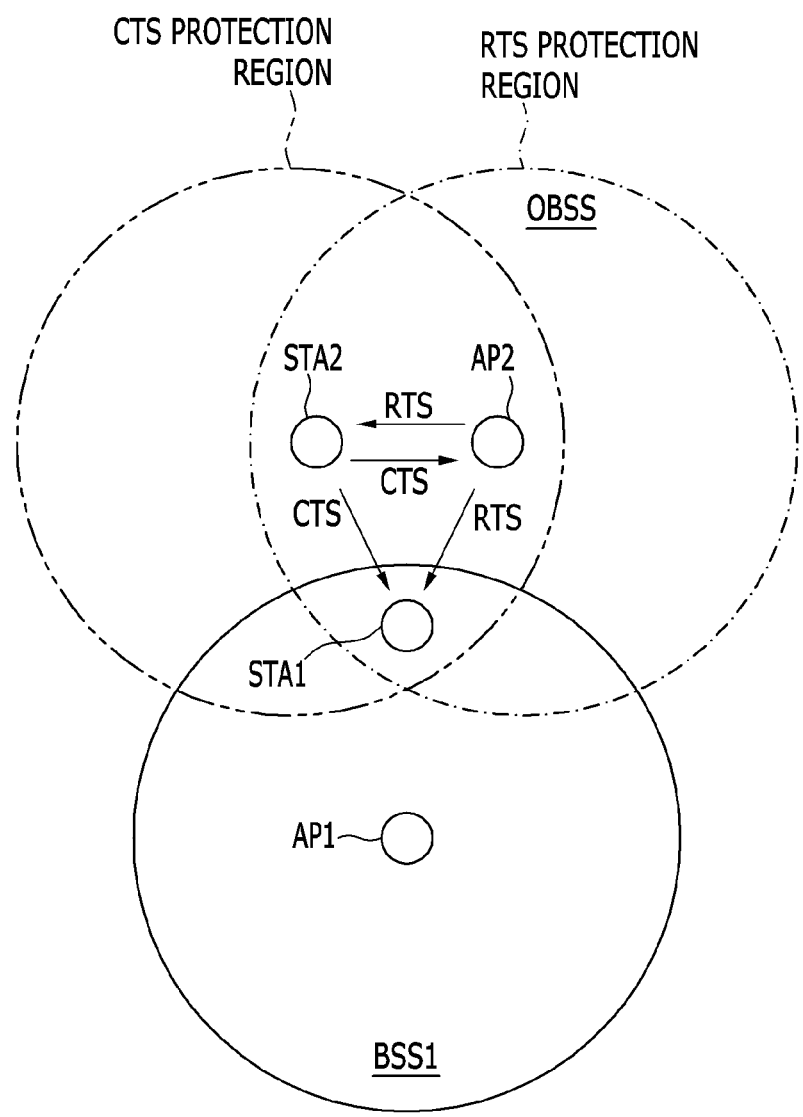
Figure 45:
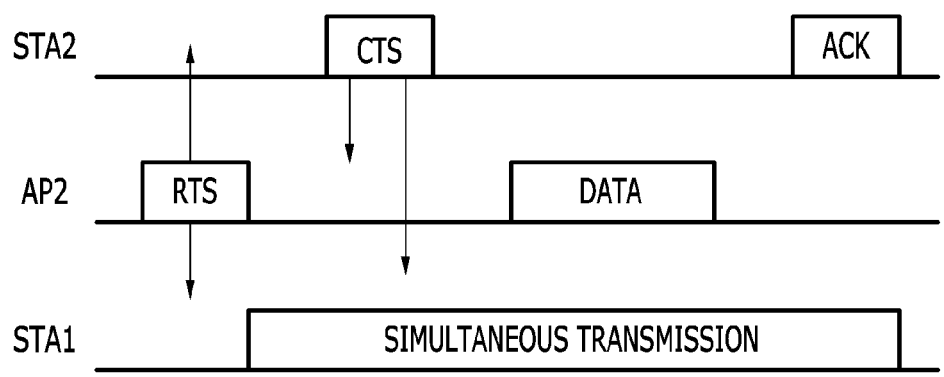

Referring to FIG. 44 and FIG. 45, a BSS formed by the AP2 is a neighbor BSS, for example an overlapping BSS (OBSS), of a BSS (BSS1) formed by the AP1.

When an RTS frame and a CTS frame are exchanged between a transmitting device (AP2) and a receiving device (STA2) in order for the AP2 to transmit downlink data to the STA2 in the OBSS, the RTS frame and the CTS frame each includes a BSS color ID as signaling information.

In this case, the STA1 belonging to the BSS1 may be included within an RTS protection region of the RTS frame transmitted by the AP2 of the OBSS and a CTS protection region of the CTS frame transmitted by the STA2 of the OBSS. The STA1, based on the BSS color IDs of the RTS frame and the CTS frame, determines that the RTS frame and the CTS frame are not transmitted from its BSS, and does not set a NAV according to the RTS frame and the CTS frame. Accordingly, the STA1 can communicate with the AP1 of its BSS (BSS1) regardless of the RTS frame and the CTS frame transmitted from the OBSS.

As described above, network efficiency can be enhanced by including the BSS color ID in the signaling information carried by the address field.

Figure 48:
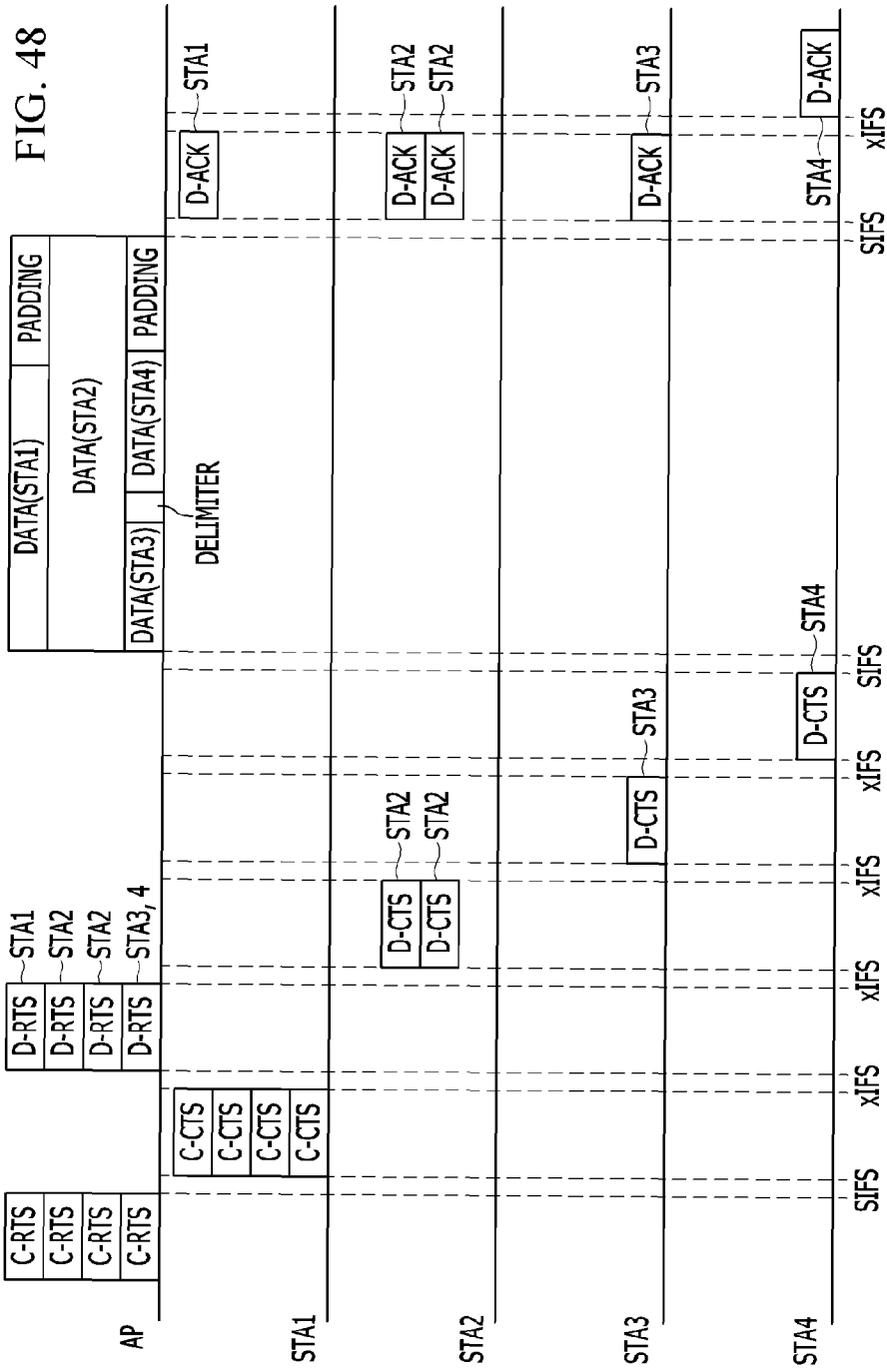
Figure 49:
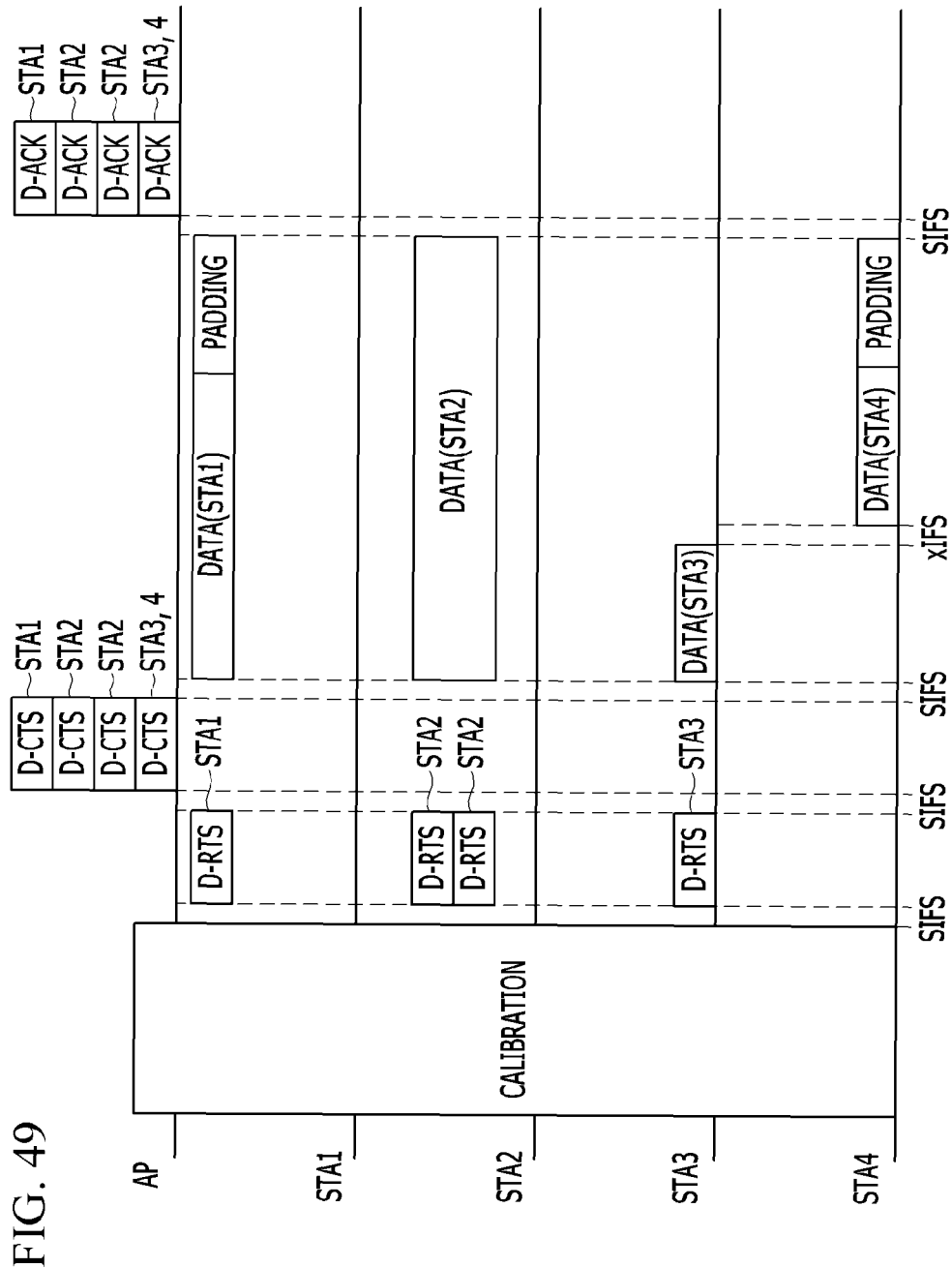
Figure 50:
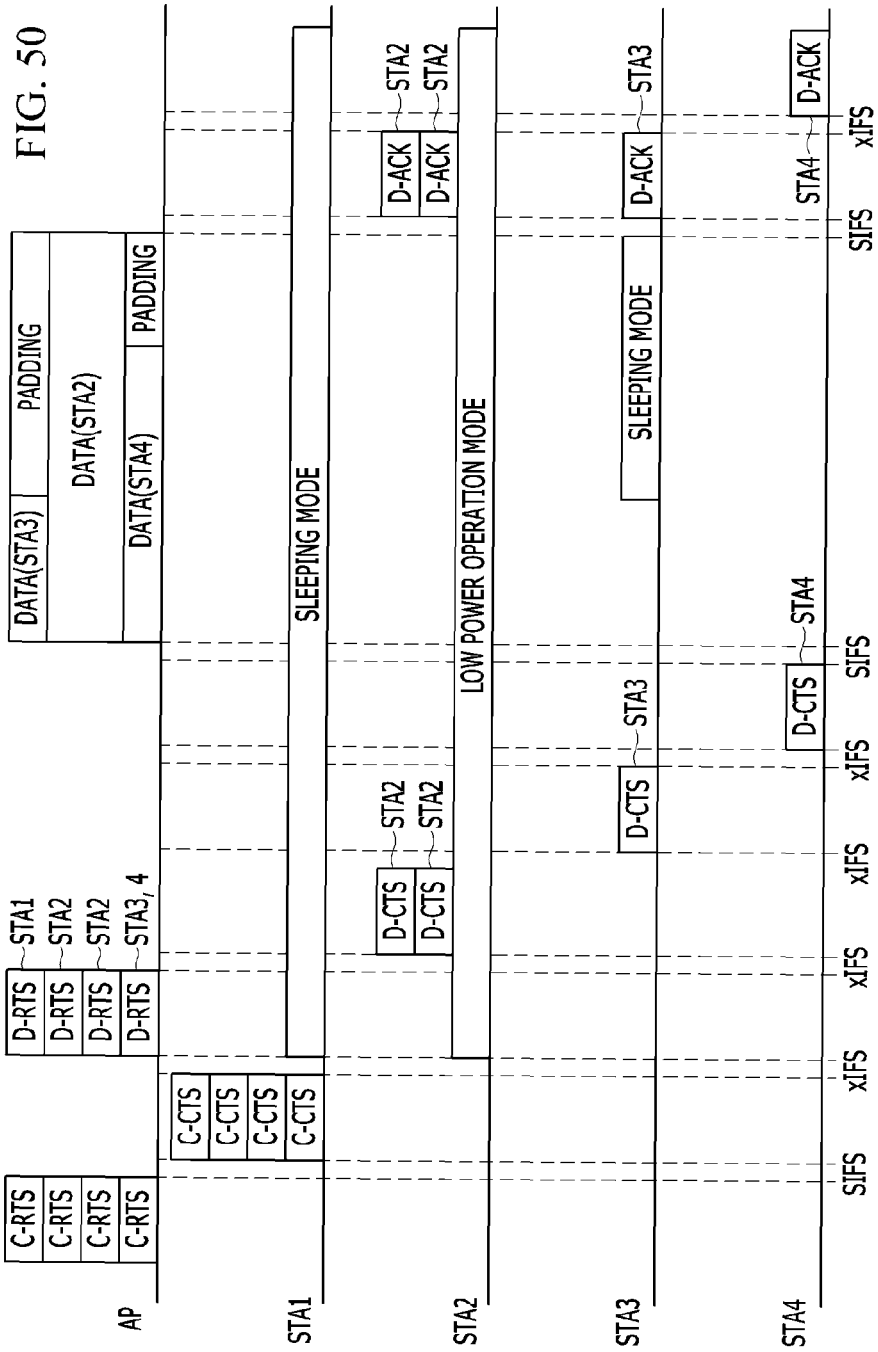
FIG. 50 shows an example for transmitting power saving information as signaling information in a WLAN according to an embodiment of the present invention.
Figure 51:
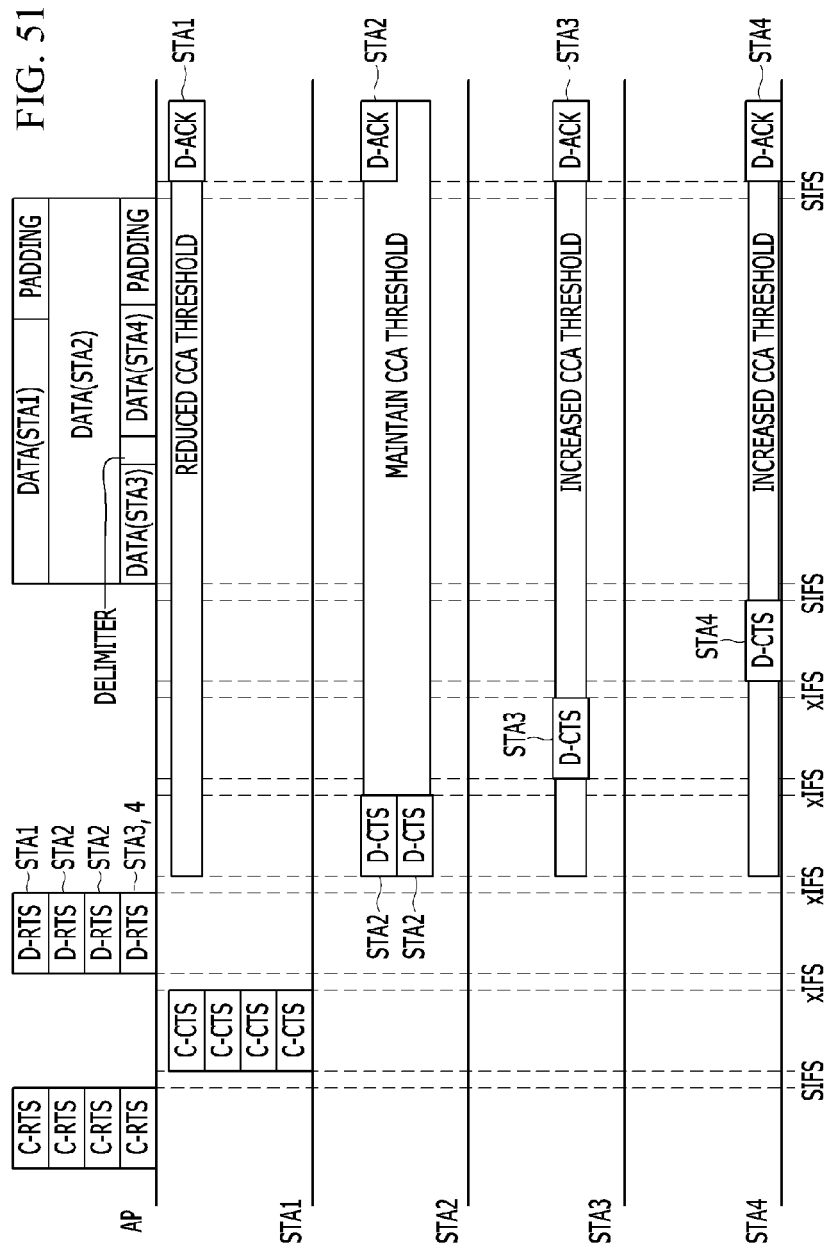
FIG. 51 shows an example for transmitting dynamic CCA information or interference information as signaling information in a WLAN according to an embodiment of the present invention.

FIG. 46, FIG. 47, FIG. 48, and FIG. 49 show examples for transmitting calibration information and/or resource allocation information as signaling information in a WLAN according to an embodiment of the present invention, FIG. 50 shows an example for transmitting power saving information as signaling information in a WLAN according to an embodiment of the present invention, and FIG. 51 shows an example for transmitting dynamic CCA information or interference information as signaling information in a WLAN according to an embodiment of the present invention.

It is assumed in FIG. 46, FIG. 47, FIG. 48, FIG. 49, FIG. 50, and FIG. 51 that OFDMA transmission is used in a WLAN according to an embodiment of the present invention. Further, it is assumed in FIG. 46, FIG. 47, FIG. 48, FIG. 49, FIG. 50, and FIG. 51 that a channel width is divided into a plurality of bands, for example four bands, at the OFDMA transmission. Furthermore, it is assumed that a first band is assigned to a device (STA1), a second band and a third band are assigned to a device (STA2), and a fourth band is assigned to devices (STA3 and STA4) from among the four bands. The STA3 and STA4 may use the fourth band in a time division duplex (TDD). Additionally, it is assumed in FIG. 46, FIG. 47, FIG. 48, FIG. 49, FIG. 50, and FIG. 51 that a device (AP) is an access point and the devices (STA1, STA2, STA3, STA4) are stations.

Figure 46:
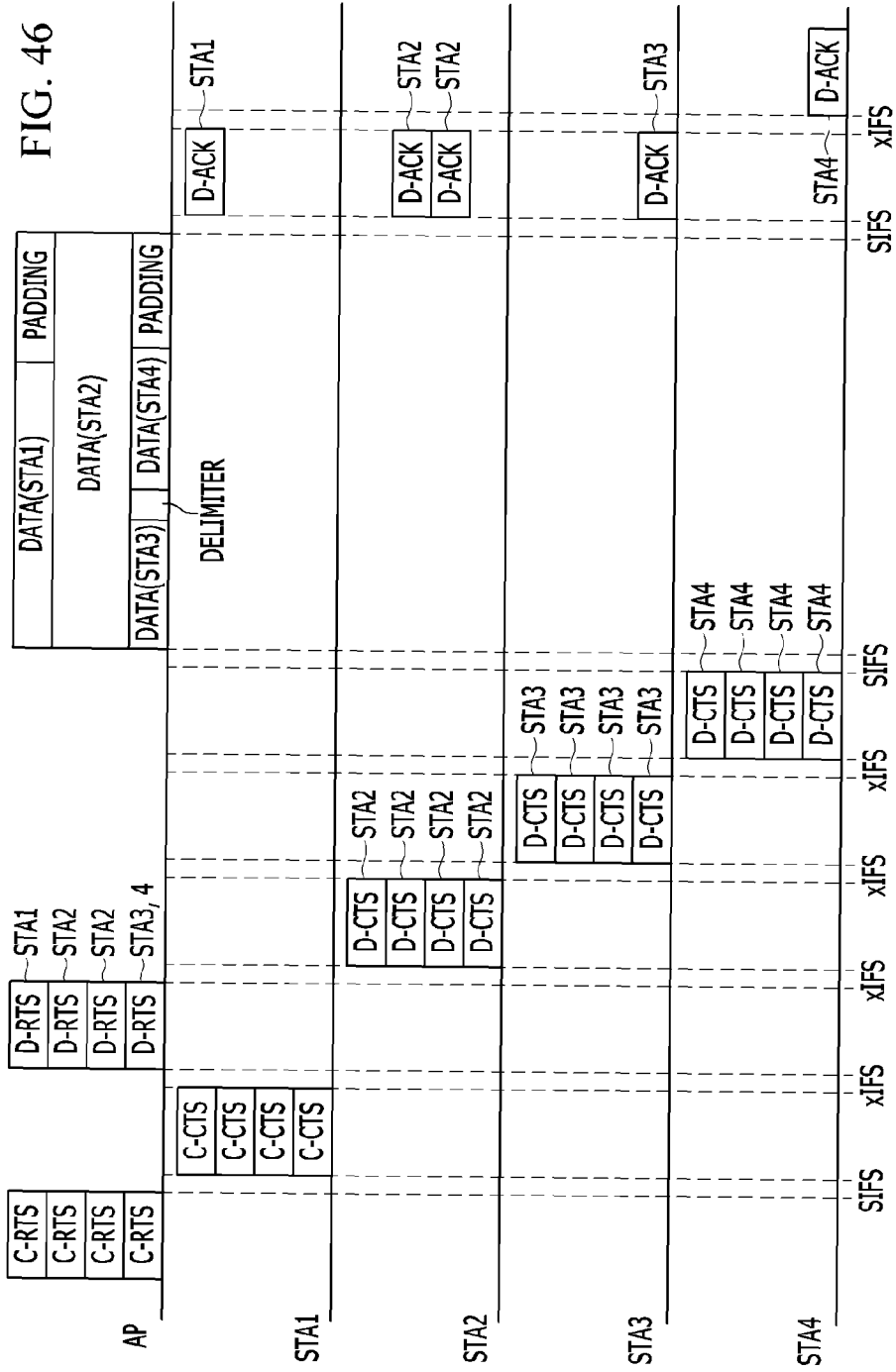
FIG. 46, FIG. 47, FIG. 48, and FIG. 49 show examples for transmitting calibration information and/or resource allocation information as signaling information in a WLAN according to an embodiment of the present invention.

Referring to FIG. 46, a transmitting device (AP) transmits a common RTS (C-RTS) frame to be commonly received by a plurality of devices (STA1, STA2, STA3, and STA4). The C-RTS frame is a frame having the same RTS on all of the bands. An address field of the C-RTS frame may include compressed addresses of the STA1, STA2, STA3, and STA4. The signaling information may include resource allocation information of each of the STA1, STA2, STA3, and STA4. The resource allocation information may include band allocation information, i.e., frequency allocation information, and may further include symbol allocation information, i.e., time allocation information in a data field.

In one embodiment, an RA field of the C-RTS frame may include the compressed addresses of the STA1, STA2, STA3, and STA4, and the signaling information. In another embodiment, the RA field of the C-RTS frame may include the compressed addresses of the STA1, STA2, STA3, and STA4, and a TA field of the C-RTS frame may include the signaling information.

In the STA1, STA2, STA3, and STA4 having received the C-RTS frame, the STA1 may transmit a common CTS (C-CTS) frame in response to the C-RTS frame after a SIFS interval. In this case, dedicated CTS (D-CTS) information of the STA1 may be piggybacked to the C-CTS frame.

Since the C-RTS frame and the C-CTS frame are transmitted on the entire bands, previous WLAN devices may receive the C-RTS frame or the C-CTS frame as well as the HEW devices. Other devices having received the C-RTS frame or the C-CTS frame set NAVs based on a duration field of the C-RTS frame or C-CTS frame since their addresses do not match the RA field of the C-RTS frame or C-CTS frame.

Next, the AP transmits dedicated RTS (D-RTS) frames. The D-RTS frames are set for each band. For example, the D-RTS frame for the STA1 may be transmitted on the first band, the D-RTS frames for the STA2 may be transmitted on the second and third bands, and the D-RTS frame for the STA3 and STA4 may be transmitted on the fourth band. An address field of the D-RTS frame for each band includes information dedicated to the receiving device assigned to the corresponding band as signaling information. For example, the signaling information may include information for transmission and reception between the transmitting device and the receiving device and calibration information for uplink transmission. In one embodiment, an RA field of the D-RTS frame for each band may include a compressed address and signaling information of a receiving device assigned to the corresponding band. In another embodiment, the RA field of the D-RTS frame for each band may include an address or the compressed address of the receiving device assigned to the corresponding band device, and a TA field of the D-RTS frame may include the signaling information.

In some embodiments, the AP having received the C-CTS frame may transmit the D-RTS frame after an xIFS interval. The xIFS interval may be equal to the SIFS interval. Alternatively, the xIFS interval may be different from the SIFS interval and may be for example shorter than an IFS interval.

The STA2 having received the D-RTS frame transmits its D-CTS frame after the xIFS interval. Subsequently, the STA3 transmits its D-CTS frame after the xIFS interval, and then the STA4 transmits its D-CTS frame after the xIFS interval. The D-CTS frame may include information dedicated to the corresponding device as the signaling information. As described above, the information dedicated to the STA1 may be piggybacked to the C-CTS frame.

As such, the calibration information for the OFDMA transmission and/or information for transmission and reception of each device can be transmitted by using the address field for carrying the signaling information.

Next, the AP receives the last D-CTS frame and then transmits a data frame after the SIFS interval. For each band, the data frame includes data of the devices assigned to the corresponding band. When the data of the devices (STA1, STA2, STA3, and STA4) are different in length, pad bits may be added to a data field including the data having short length.

When the data for the different devices (STA3 and STA4) are transmitted on the same band, the data for the STA3 and STA4 may be transmitted in time division duplex (TDD). A delimiter may be inserted between the data for the STA3 and STA4.

Next, the STA1, STA2, STA3, and STA4 receive the data frame from the AP and then transmit ACK frames after the SIFS interval. Each of the STA1, STA2, STA3, and STA4 may transmit a dedicated ACK (D-ACK) frame on the allocated band. When the STA3 and STA4 use the same band, one device (for example, the STA3) may transmit the D-ACK frame and then the other device (for example, the STA4) may transmit the D-ACK frame after the xIFS interval.

Figure 47:
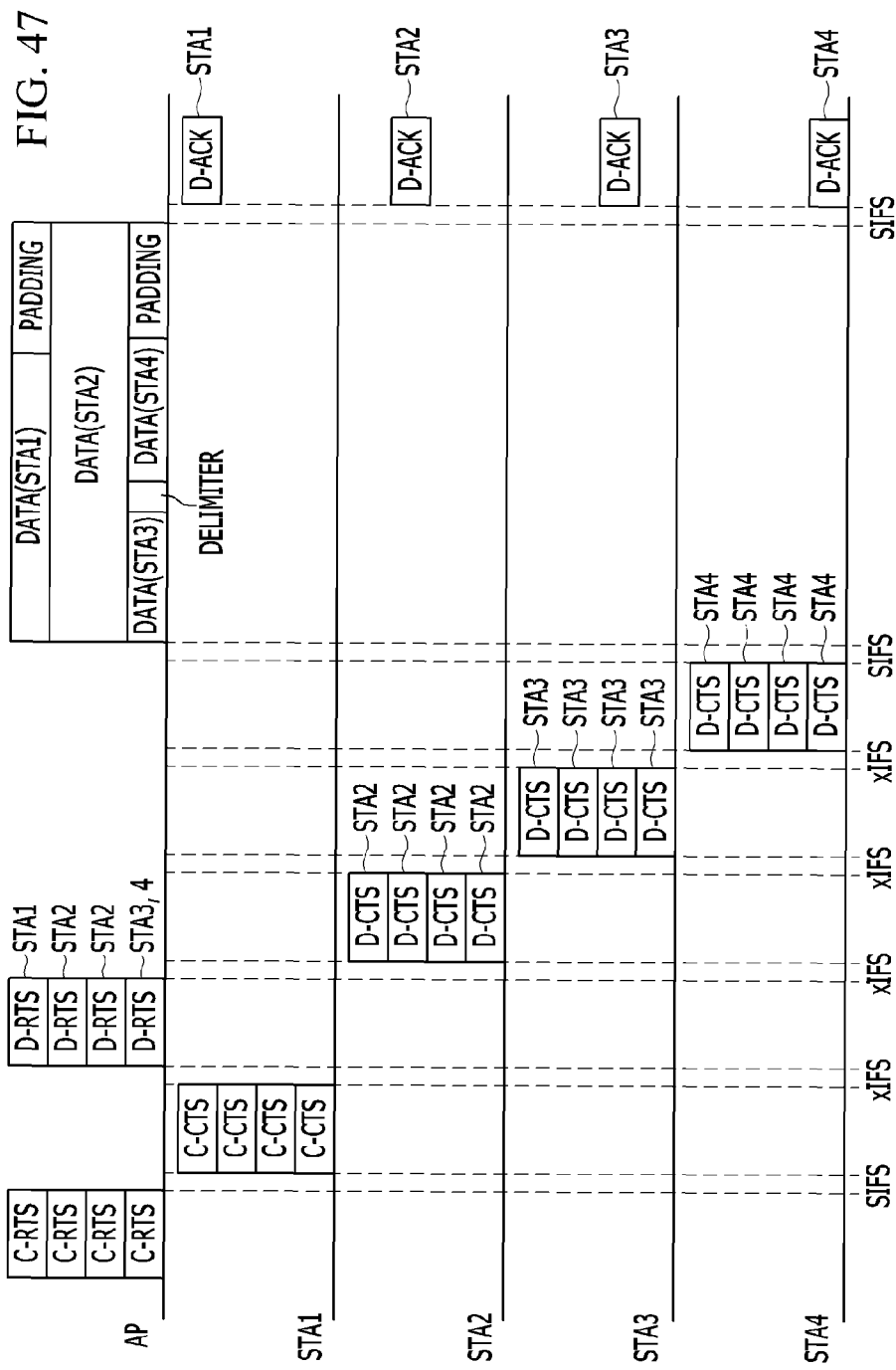

Referring to FIG. 47, when the AP transmits the data frame, the data frame may include information on a resource (for example, a band) that is allocated to each receiving device for transmitting the D-ACK frame. For example, when the STA2 uses the two bands, the AP may allocate one band to the STA2 as a band for transmitting the D-ACK frame and may allocate the other band to one device (STA3) of the STA3 and STA4 using the same band as a band for transmitting the D-ACK frame. The STA1 transmits the D-ACK frame on the first band, the STA2 transmits the D-ACK frame on the second band, the STA3 transmits the D-ACK frame on the third band, and the STA4 transmits the D-ACK frame on the fourth band. Accordingly, all of the STA1, STA2, STA3, and STA4 can transmit the D-ACK frames at the same time.

Referring to FIG. 48, upon transmitting the D-CTS frames, the STA2, STA3, and STA4 may transmit the D-CTS frames on the allocated bands.

Referring to FIG. 49, after calibration for uplink OFDMA transmission is complete between transmitting devices (STA1, STA2, STA3, and STA4) and a receiving device (AP), each of the STA1, STA2, STA3, and STA4 transmits a D-RTS frame on an allocated band. In one embodiment, only one device (STA3) of the STA3 and STA4 using the same band may transmit the D-RTS frame. In another embodiment, one device (STA3) may transmit the D-RTS frame and then the other device (STA4) may transmit the D-RTS frame after the xIFS interval.

The AP having received the D-RTS frame transmits D-CTS frames after the SIFS interval. The D-CTS frames are set for each band. For example, the D-CTS frame for the STA1 may be transmitted on the first band, the D-CTS frames for the STA2 may be transmitted on the second and third bands, and the D-CTS frame for the STA3 and STA4 may be transmitted on the fourth band. An RA field of the D-CTS frame for each band includes information dedicated to the receiving device assigned to the corresponding band as signaling information. For example, the signaling information may include information for transmission and reception between the transmitting device and the receiving device and/or resource allocation information. In some embodiments, the RA field of the D-CTS frame for each band may further include a compressed address of the receiving device assigned to the corresponding band.

In order to perform the calibration, any one device of the STA1, STA2, STA3, and STA4 may transmit the C-RTS frame and the AP may transmit the C-CTS frame to the STA1, STA2, STA3, and STA4. The C-CTS frame may resource allocation information of the STA1, STA2, STA3, and STA4.

Next, each of the STA1, STA2, STA3, and STA4 receives the D-CTS frame on the corresponding band and then transmits a data frame on the corresponding band after the SIFS interval. For example, the STA1 may transmit the data frame on the first band, the STA2 may transmit the data frames on the second and third bands, and the STA3 and STA4 may transmit the data frame on the fourth band. The STA3 and STA4 using the same may transmit the data frame in TDD. The STA3 may transmit the data frame and then the STA4 may transmit the data frame after the SIFS interval.

Next, the AP receives the data frames from the STA1, STA2, STA3, and STA4 and then transmits D-ACK frames after the SIFS interval. The AP may transmit the D-ACK frames by assigning an ACK for each of the STA1, STA2, STA3, and STA4 to the corresponding band. The ACK for the STA3 and STA4 using the same may be assigned to the fourth band as a block ACK. The STA3 and STA4 may identify their own ACK based on a bitmap of the block ACK.

Referring to FIG. 50, a device may perform a power saving operation by exchanging an RTS frame and a CTS frame. In some embodiments, an address field of a C-RTS frame and/or a C-CTS frame may include power saving information as signaling information. In one embodiment, a power saving mode may include a sleep mode. In another embodiment, a power saving mode may include a low power operation mode. The sleep mode may be a mode in which a device activates a local timer of a MAC layer and deactivates remaining operations. The low power operation mode may be a mode in which a communication bandwidth is restricted. For example, the low power operation mode may be a mode for reducing power consumption by lowering an operation frequency of a device or deactivating some operation circuits.

In some embodiments, a D-RTS frame and/or a D-CTS frame may include power saving information as signaling information in address field.

Assuming that a transmitting device (AP) has no data for transmitting a receiving device (STA1), the C-RTS frame may include information about a sleep mode of the STA1 as the signaling information. Accordingly, the STA1 can enter the sleep mode after transmitting the C-CTS frame. The C-RTS frame may, as the signaling information, include information about a low power operation mode of a receiving device (for example, STA2) to which a part of the bands is allocated. Since the STA2 can transmit or receive a frame on only the allocated bands (the second and third band), the STA2 may deactivate a circuit associated with a band except the allocated band. Accordingly, after the C-CTS frame is transmitted, the STA2 can enter the low power operation mode. When a length of data to be transmitted to a receiving device (STA3) is short, the C-RTS frame may as the signaling information include information associated with a sleep mode of the STA3. The STA3 can enter a sleep mode after a period corresponding to the data to be received from a data frame.

When the AP has no data to be transmitted to the STA1, the AP may transmit data for another device (for example, a STA3) on the band allocated to the STA1. In this case, the C-RTS frame or the D-RTS frame may as the signaling information include information indicating the data is transmitted on another band.

As such, because the power saving information is provided through the address field, the STA1, STA2, STA3, and STA4 can reduce the power consumption.

Referring to FIG. 51, a transmitting device (AP) may adjust a CCA threshold by exchanging an RTS frame and a CTS frame.

The AP may determine network environment of each of receiving devices (STA1, STA2, STA3, and STA4) and may include information for adjusting the CCA threshold to an address field of a D-RTS frame as signaling information. In some embodiments, the information for adjusting the CCA threshold may include a CCA adjusting factor and/or interference information. The interference information may include a power of an interference signal and/or a cycle of the interference signal. For example, if an influence which the OBSS have on the STA1 is decreased, the D-RTS frame may include information for reducing the CCA threshold of the STA1 as the signaling information. If an influence which the OBSS have on the STA2 is not changed, the D-RTS frame may include information for maintaining the CCA threshold of the STA2 as the signaling information. If an influence which the OBSS have on the STA3 and STA4 is increased, the D-RTS frame may include information for increasing the CCA threshold of the STA3 and STA4 as the signaling information.

As such, because the dynamic CCA information is provided through the address field, the STA1, STA2, STA3, and STA4 can adjust the CCA threshold according to the network environment thereby enhancing the network efficiency.

Figure 52:
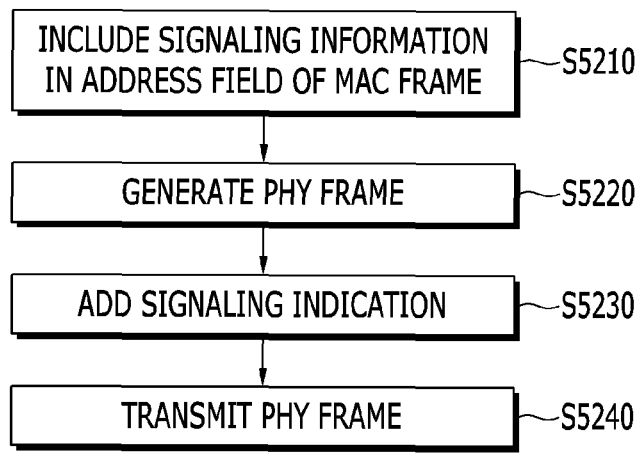
FIG. 52 and FIG. 53 exemplify a flowchart of a signaling method by a device in a wireless communication network according to an embodiment of the present invention.
Figure 53:
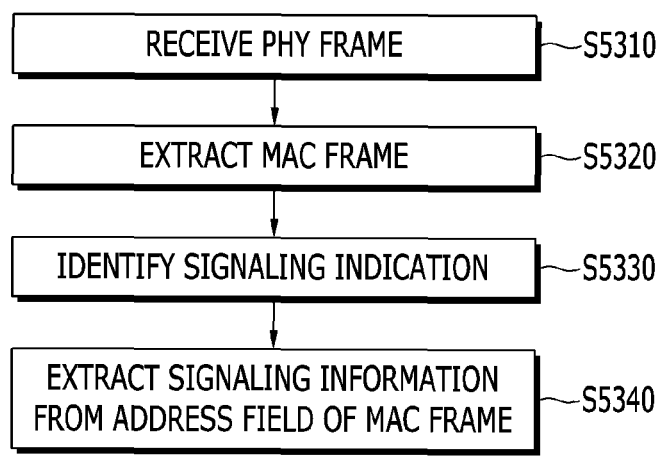

FIG. 52 and FIG. 53 exemplify a flowchart of a signaling method by a device in a wireless communication network according to an embodiment of the present invention.

Referring to FIG. 52, a transmitting device includes signaling information in an address field of a MAC frame (S5210) and generates a PHY frame having a data field into which the MAC frame is inserted (S5220). The transmitting device transmits the generated PHY frame (S5240).

In some embodiments, the transmitting device may indicate whether the signaling information is transmitted through the address field. In this case, the transmitting device may add to the MAC frame or the PHY frame a signaling indication for indicating whether the signaling information is transmitted through the address field (S5230). While the step S5230 for adding the signaling indication has been shown after the step S220 in FIG. 52, the S5230 may be performed before the S5210 and/or the step or may be performed at the same time as the step S5210 and/or the step S5220.

Referring to FIG. 53, a receiving device receives a PHY frame (S5310) and extracts a MAC frame from a data field of the received PHY frame (S5320). When a signaling indication indicates that signaling information is transmitted through an address field, the receiving device extracts the signaling information from the address field of the MAC frame (S5340).

In some embodiments, a transmitting device may indicate whether the signaling information is transmitted through the address field. In this case, the receiving device may identify a signaling indication from the PHY frame or the MAC frame (S5330). While the step S5330 for identifying the signaling indication has been shown after the step S320 in FIG. 53, the S5330 may be performed before the S5320 or may be performed at the same time as the step S5320.

A signaling method according to above embodiments of the present invention may be executed by a baseband processor 10 shown in FIG. 1 to FIG. 3. In one embodiment, instructions for executing the signaling method according to above embodiments of the present invention may be stored in a recording medium such as a memory 40. In another embodiment, at least some of the instructions may be MAC software. In yet another embodiment, at least some of the instructions may be transmitted from a recording medium of a certain server and may be stored in the memory 40.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Further, two or more embodiments may be combined.

What is claimed is:

1. A signaling method by a device in a wireless local area network, the method comprising:
   including signaling information in an address field;
   generating a medium access control (MAC) frame including the address field; and
   transmitting a physical layer (PHY) frame including a data field into which the MAC frame is inserted,
   wherein the address field further includes a compressed address into which an address of the device or an address of a device destined to receive the MAC frame is compressed.

2. The method of claim 1, wherein the address field further includes a plurality of compressed addresses into which addresses of a plurality of devices destined to receive the MAC frame are respectively compressed.

3. The method of claim 2, wherein the signaling information includes information on a number of the compressed addresses.

4. The method of claim 2, wherein the signaling information includes signaling information dedicated to each of the plurality of devices.

5. The method of claim 1, wherein all bytes of the address field are assigned to the signaling information, and
   wherein the signaling information includes information on basic service set (BSS) to which the device belongs.

6. The method of claim 5, wherein the information on the BSS includes a BSS color identifier for distinguishing neighboring BSSs.

7. The method of claim 5, wherein the information on the BSS includes a partial association identifier generated by some bits of an association identifier of the device and an identifier of the BSS.

8. The method of claim 1, wherein the PHY frame further includes an indication for indicating whether the signaling information is transmitted through the address field.

9. The method of claim 8, wherein the indication is included in the signaling information.

10. The method of claim 8, wherein the MAC frame further includes a frame control field, and
    wherein the indication is carried by a predefined value of a subtype field in the frame control field.

11. The method of claim 8, wherein the MAC frame further includes a frame control field, and
    wherein the indication is carried by a predefined bit of the frame control field.

12. The method of claim 8, wherein the indication is carried by a predefined bit of the address field.

13. The method of claim 8, wherein the MAC frame further includes a duration field, and
    wherein the indication is carried by a predefined value of the duration field.

14. The method of claim 8, wherein the data field includes a service field, and
    wherein the indication is carried by a predefined bit of $8^{th}$ to $16^{th}$ bits in the service field.

15. The method of claim 8, wherein the data field includes a service field,
    wherein an initial 7 bits of the service field corresponds to an initial 7 bits of a scrambling sequence, and
    wherein the indication is carried by a predefined bit of the initial 7 bits of the scrambling sequence.

16. The method of claim 15, wherein the predefined bit includes a $4^{th}$ or $5^{th}$ bit of the initial 7 bits of the scrambling sequence.

17. A signaling method by a device in a wireless local area network, the method comprising:
    receiving a physical layer (PHY) frame;
    extracting a medium access control (MAC) frame from a data field of the PHY frame; and
    extracting signaling information from an address field of the MAC frame,
    wherein the address field further includes a compressed address into which an address of the device or an address of a device transmitting the MAC frame is compressed.

18. The method of claim 17, wherein all bytes of the address field are assigned to the signaling information, and
    wherein the signaling information includes information on a basic service set (BSS) to which the device belongs.

* * * * *